US008037138B2

(12) United States Patent
Izumi

(10) Patent No.: US 8,037,138 B2
(45) Date of Patent: Oct. 11, 2011

(54) COMMUNICATION APPARATUS, COMMUNICATION CONTROL METHOD OF COMMUNICATION APPARATUS, AND CONTROL PROGRAM OF COMMUNICATION APPARATUS FOR SELECTING A TRANSMISSION PATH FOR IMAGE DATA

(75) Inventor: Michihiro Izumi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 796 days.

(21) Appl. No.: 10/530,867

(22) PCT Filed: Oct. 9, 2003

(86) PCT No.: PCT/JP03/12979

§ 371 (c)(1),
(2), (4) Date: Nov. 30, 2005

(87) PCT Pub. No.: WO2004/034657

PCT Pub. Date: Apr. 22, 2004

(65) Prior Publication Data

US 2006/0155864 A1    Jul. 13, 2006

(30) Foreign Application Priority Data

Oct. 10, 2002 (JP) ................................ 2002-296838
Oct. 25, 2002 (JP) ................................ 2002-310389

(51) Int. Cl.
*G06F 15/16* (2006.01)
(52) U.S. Cl. ....................................... 709/206; 358/400
(58) Field of Classification Search .................. 709/206; 358/400
See application file for complete search history.

(56) References Cited

U.S. PATENT DOCUMENTS 6,209,048 B1 * 3/2001 Wolff ............................... 710/62
6,961,137 B1 * 11/2005 Tamura ........................ 358/1.15
(Continued)

FOREIGN PATENT DOCUMENTS

EP    1 059 796    12/2000
(Continued)

OTHER PUBLICATIONS

David Angell. DSL for Dummies. Jun. 23, 1999. IDG Books Worldwide. p. 46.*

(Continued)

*Primary Examiner* — Ajay Bhatia
*Assistant Examiner* — Bryan Lee
(74) *Attorney, Agent, or Firm* — Fitzpatrick, Cella, Harper & Scinto

(57) ABSTRACT

In a communication apparatus corresponding to an analog communication path of a voice band and a network communication path, high-speed and high-reliability data communication are performed by selecting an appropriate communication path without troublesome user operation. A communication apparatus which performs IP communication and analog communication via an ADSL gateway obtains the IP address of a destination station from an SIP proxy server and transmits/receives communication data to/from the destination station on an IP network by a file transmit/receive protocol such as FTP, HTTP or the like, when the telephone number of the destination station corresponds to a VoIP network. The apparatus performs analog facsimile communication on a line switching network when the telephone number of the destination station does not correspond to the VoIP network. The apparatus performs the analog facsimile communication on the VoIP network or the line switching network when the destination station corresponds to the VoIP network but does not have any digital communication means.

12 Claims, 19 Drawing Sheets

U.S. PATENT DOCUMENTS

| | | | |
|---|---|---|---|
| 7,133,899 B2 * | 11/2006 | Rowe | 709/206 |
| 2002/0001302 A1 * | 1/2002 | Pickett | 370/352 |
| 2002/0095516 A1 | 7/2002 | Nada | 709/245 |
| 2003/0026400 A1 * | 2/2003 | Bashoura et al. | 379/100.14 |
| 2003/0028892 A1 * | 2/2003 | Gewickey et al. | 725/110 |
| 2003/0154283 A1 * | 8/2003 | Brown | 709/226 |
| 2003/0164986 A1 * | 9/2003 | Boire-Lavigne et al. | 358/400 |
| 2004/0001221 A1 * | 1/2004 | McCallum | 358/1.15 |
| 2004/0057568 A1 * | 3/2004 | Kawabata et al. | 379/220.01 |
| 2004/0196506 A1 | 10/2004 | Izumi et al. | 358/402 |

FOREIGN PATENT DOCUMENTS

| | | |
|---|---|---|
| EP | 1 059 796 A2 | 12/2000 |
| JP | 09-247334 | 9/1997 |
| JP | 10-107938 | 4/1998 |
| JP | 10-133967 | 5/1998 |
| JP | 2000-354127 | 12/2000 |
| JP | 2001-016328 | 1/2001 |
| JP | 2001-16328 | 1/2001 |
| JP | 2001-160866 | 6/2001 |
| JP | 2001-197279 | 7/2001 |
| JP | 2002-101198 | 4/2002 |
| JP | 2002-305606 | 10/2002 |

OTHER PUBLICATIONS

Gonzalo Amarillo. SIP Demystified. Aug. 28, 2001. McGraw-Hill. pp. 151-157.*

J. Rosenberg et al. RFC 3261—SIP: Session Initiate Protocol. Jun. 2002. pp. 36-37, 141-142.*

Drew et al. Next Generation VoIP Network Architecture. Mar. 2003.*

B. Turner, "SIP: New Tide of IP Signaling Protocol", Computer & Network LAN, Jul. 2002, vol. 20, No. 7, pp. 50-52.

* cited by examiner

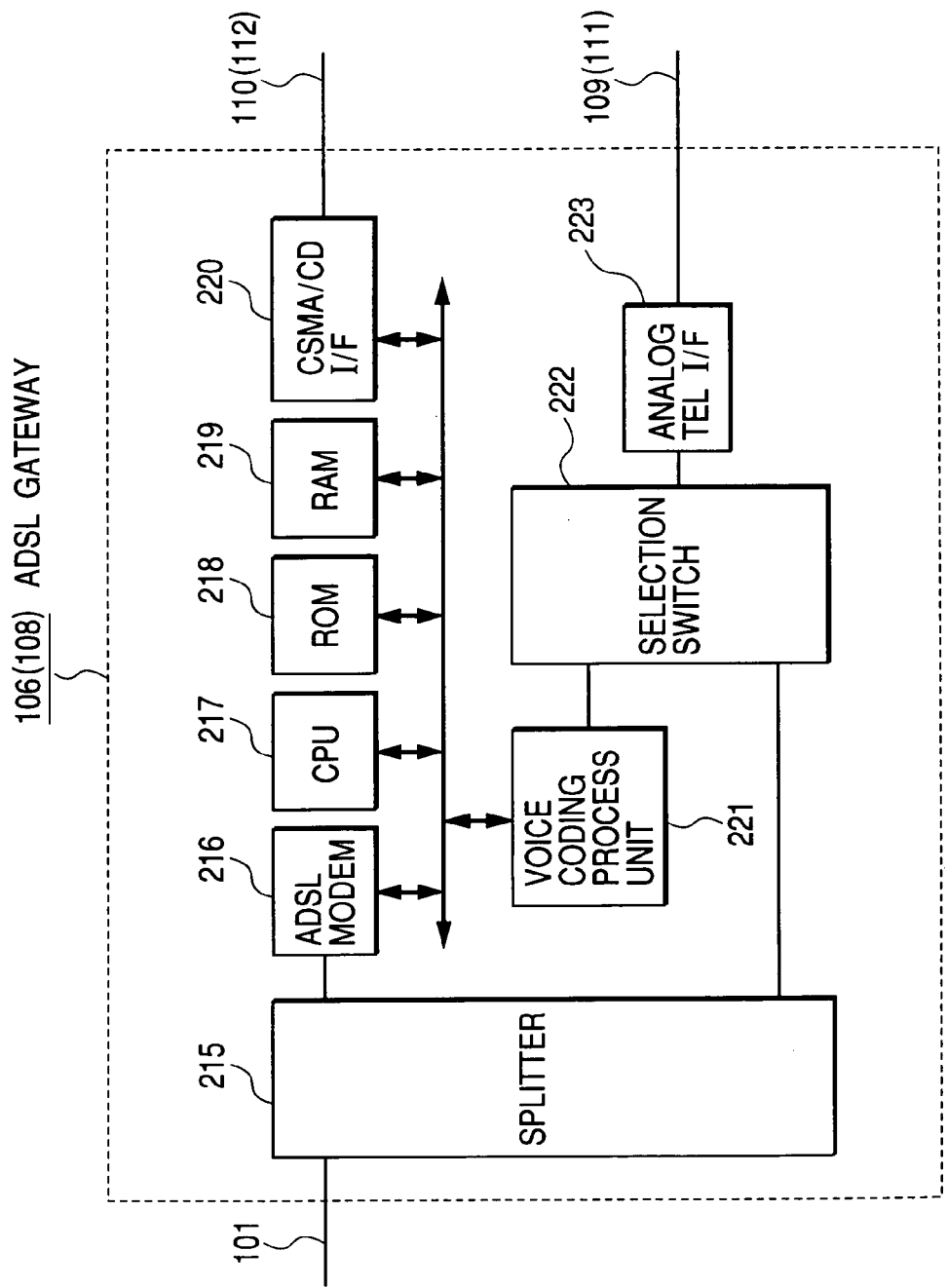

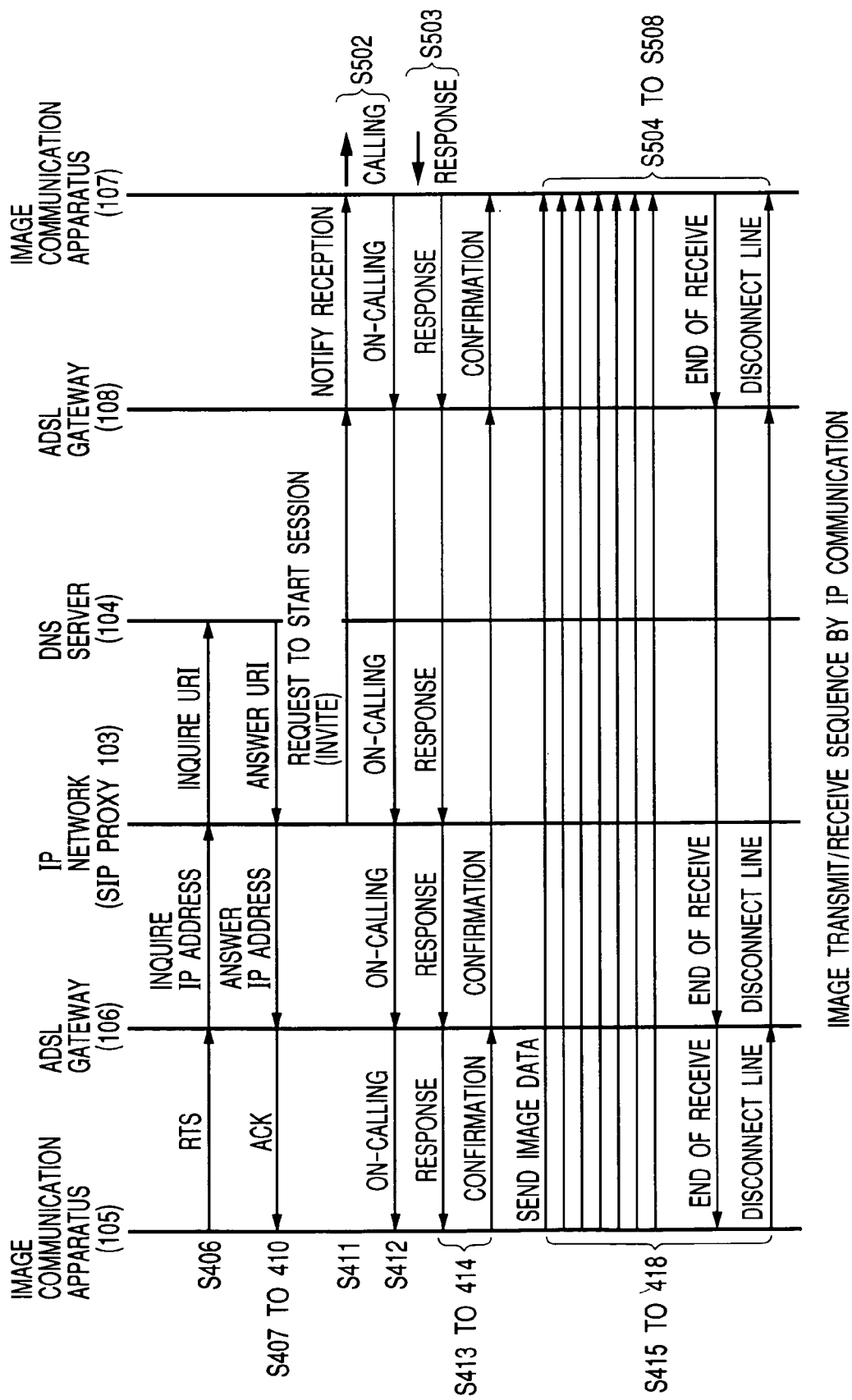

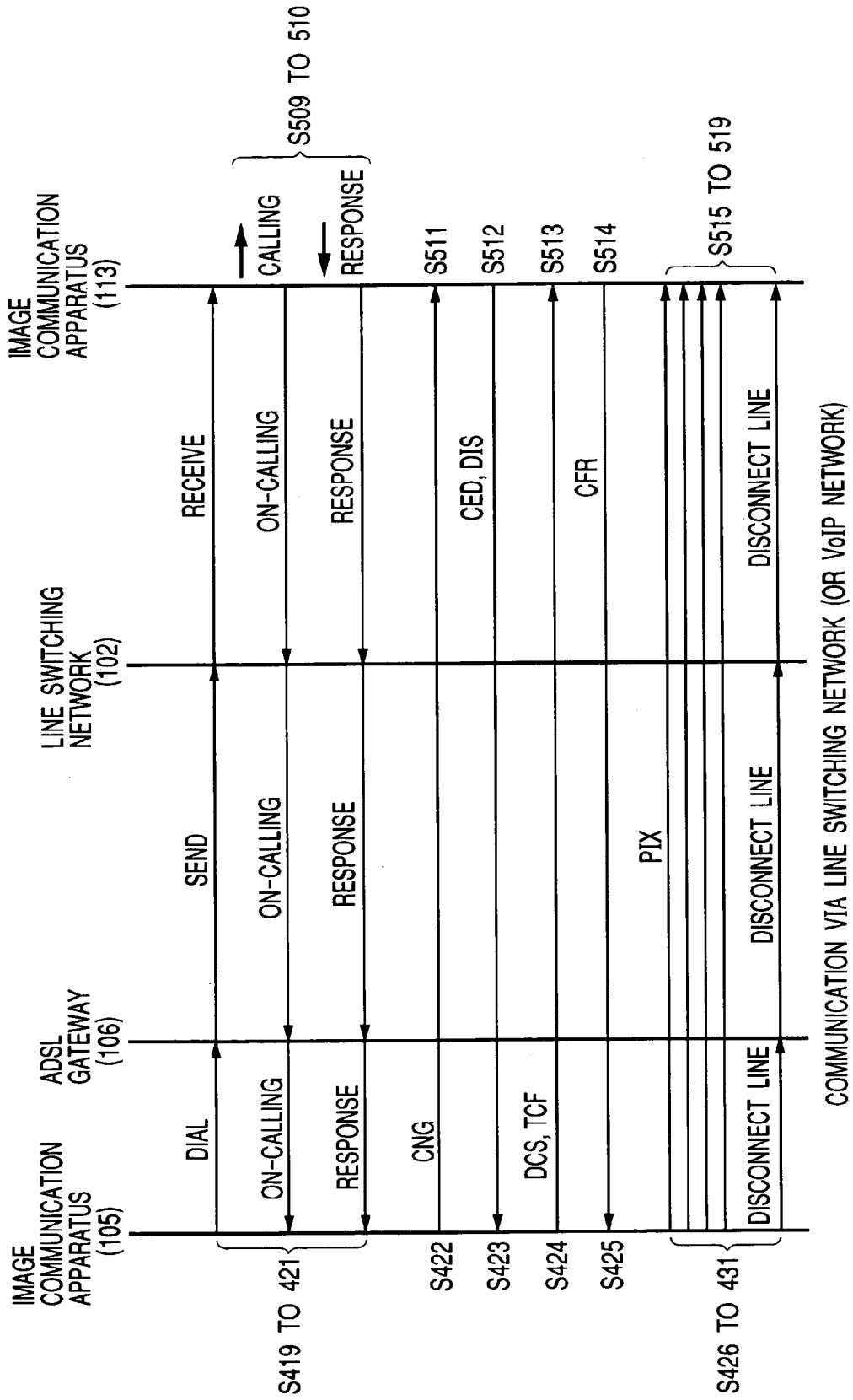

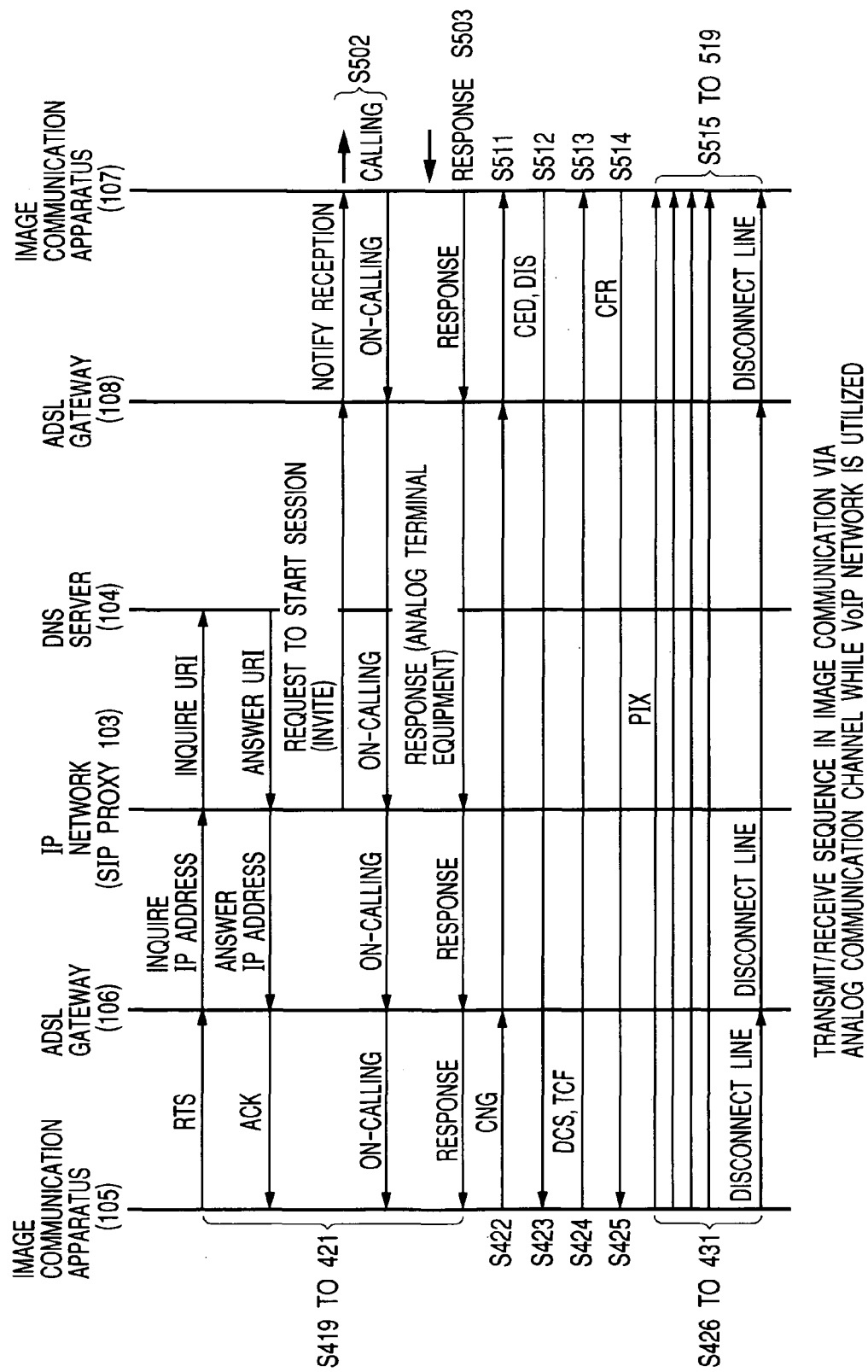

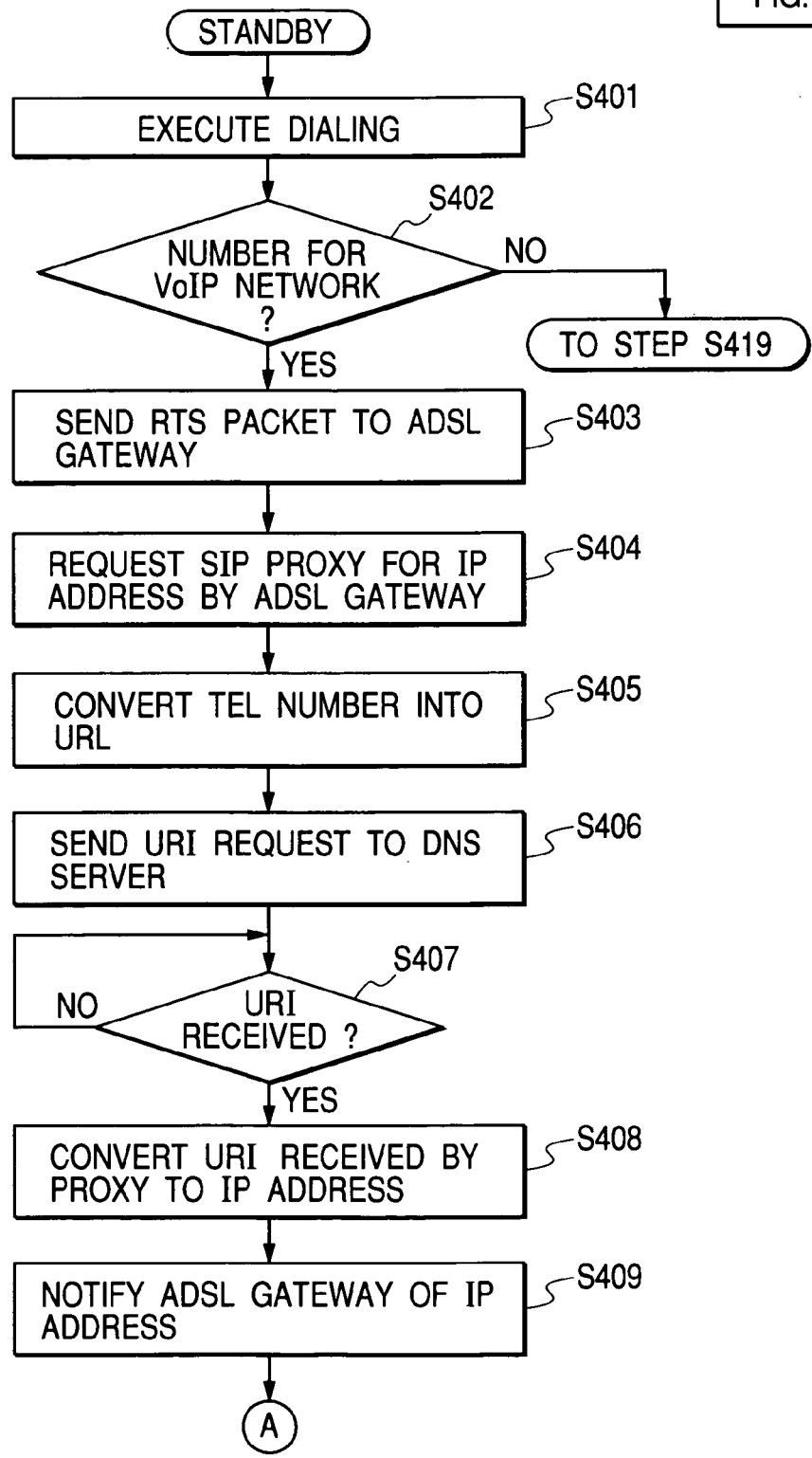

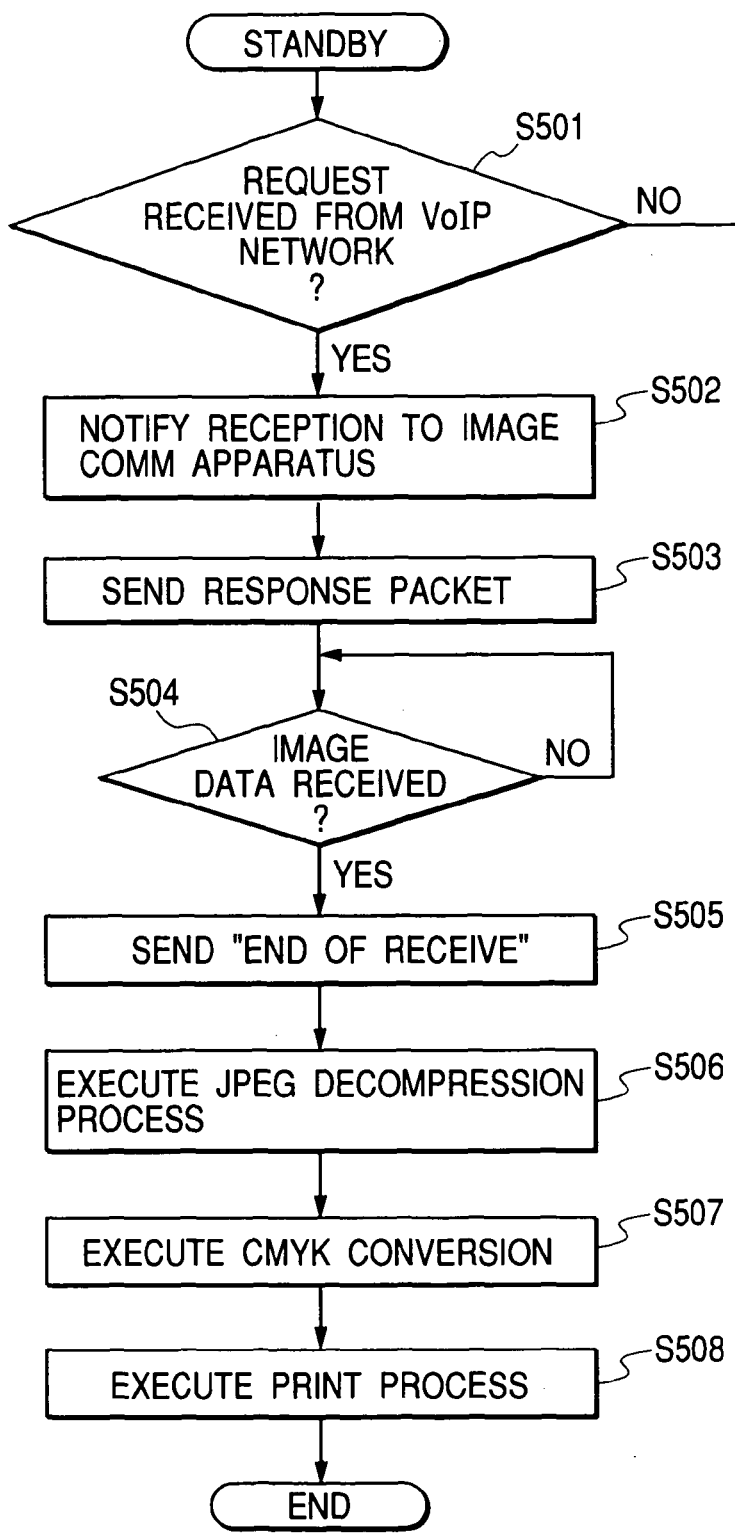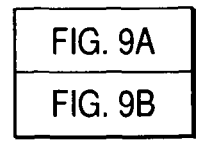

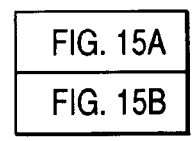
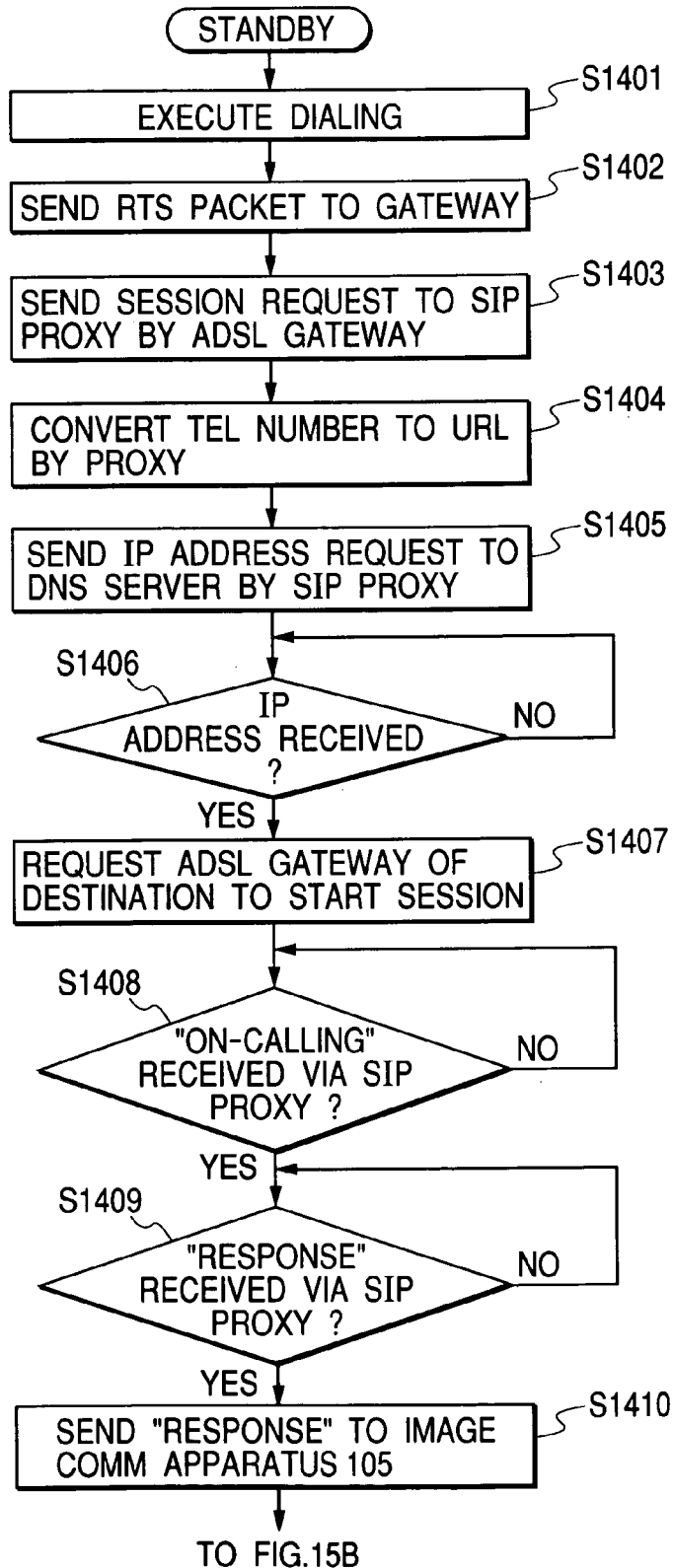

COMMUNICATION APPARATUS, COMMUNICATION CONTROL METHOD OF COMMUNICATION APPARATUS, AND CONTROL PROGRAM OF COMMUNICATION APPARATUS FOR SELECTING A TRANSMISSION PATH FOR IMAGE DATA

TECHNICAL FILED

The present invention relates to a communication apparatus which includes an IP (Internet Protocol) communication means and transmits/receives communication data to/from a destination station discriminated by a telephone number, a control method of the communication apparatus, and a control program for the communication apparatus.

BACKGROUND ART

In recent years, a broadband communication line such as an ADSL (Asymmetric Digital Subscriber Line) which can perform high-speed data transmission is in widespread use. The ADSL is characterized in that a metallic cable same as a telephone line is used as a fine for a subscriber, whereby the identical line can be used for both an analog telephone service and a network connection service. That is, by inserting a frequency division filter called a splitter between the communication line and a communication terminal equipment, the line for transmitting a voice band signal can be separated from the line for transmitting digital data.

When the same line is used for the analog telephone service, various structures such as "ADSL modem+splitter+computer", "ADSL modem+splitter+router" and the like can be considered as the structure of subscriber's equipments. On one hand, for example, the structure that the ADSL modem and the splitter are unified can be considered as an ADSL gateway which is used in consideration of common use with the telephone service.

In the ADSL gateway like this, for example, a modular jack is provided so that an analog telephone can be connected to the line which is used to transmit the voice band signal, whereby communication can be performed by connecting a communication apparatus such as the telephone or a facsimile machine to the modular jack.

Moreover, a CSMA/CD (Carrier Sense Multiple Access with Collision Detector) connection interface such as Ethernet™ is provided in the ADSL gateway so as to achieve high-speed digital communication. Thus, by connecting a PC (personal computer) or the like to the CSMA/CD interface, data can be downloaded at high speed from a WWW server or the like. However, as the interface between the ADSL gateway and network equipments such as the PC and the like, an interface such as a USB (Universal Serial Bus) or the like is used in addition to the CSMA/CD interface.

The terminal equipment such as the PC which is used by connecting it to the server can achieve high-speed communication, and on one hand the terminal equipment such as the telephone or the facsimile device which performs transmit/receive with a destination terminal equipment in real time via a line switching network (analog communication path) uses an analog band. In an analog facsimile procedure, although any problem does not likely occur when merely black-and-white binary image data or so is transmitted, a problem that it takes a long time occurs when color image data of a large amount (according to a JPEG (Joint Photographic Experts Group) format or the like) taken by a digital camera or the like is transmitted, In order to transmit communication data such as the image data or the like at high speed, the facsimile machine is connected to the CSMA/CD interface, the image data is uploaded to a file server in the form of packet (e.g., using a protocol such as FTP (File Transfer Protocol), HTTP (HyperText Transport Protocol) or the like), and the uploaded image data is then downloaded from the server by the destination terminal equipment. However, in this case, there occur problems that it is necessary for the receiving side to take the trouble to access the file server to receive the data and that an advantage of real-time communication is lost. Besides, when the destination address of the receiving side is notified to the server and when the data is downloaded on the initiative of the receiving side, a mechanism to notify the receiving side of the data having been uploaded is necessary. For this reason, it is difficult to achieve the communication by a simple operation of merely designating a telephone number of a communication destination as in the conventional facsimile machine.

In consideration of this point, Japanese Patent Application Laid-Open No. H10-107938 (called document 1 hereinafter) discloses the technique to perform image communication via a server on an IP network. That is, in the document 1, a first terminal equipment on an image transmitting side calls the server including the first terminal equipment, connects with the computer network via the server including the first terminal equipment, and further designates a second terminal equipment being the receiving side of the image communication. Then, a server of the network including the second terminal equipment calls the second terminal equipment, the first terminal equipment sends the image data to the server including the second terminal equipment via the computer network in a form suitable for this network, and the server including the second terminal equipment converts the received image data of the form suitable for the computer network into facsimile image data and further sends the converted image data to the second terminal equipment via a public network, whereby the second terminal equipment reproduces an image from the received facsimile image data.

Further, Japanese Patent Application Laid-Open No. H9-247334 (called document 2 hereinafter), Japanese Patent Application Laid-Open No. H10-133967 (called document 3 hereinafter) and the like propose many kinds of methods of transmitting an image in the form of electronic mail by inputting an Internet address of a communication destination.

Furthermore, Japanese Patent Application Laid-Open No. 2000-354127 (called document 4 hereinafter), Japanese Patent Application Laid-Open No. 2001-197279 (called document 5 hereinafter) and the like propose a method of relaying facsimile image transmission in real time on the Internet by applying ITU-T (International Telecommunication Union Telecommunication Standardization Sector) Recommendation T.38.

(Document 1)
Japanese Patent Application Laid-Open No. H10-107938
(Document 2)
Japanese Patent Application Laid-Open No. H9-247334
(Document 3)
Japanese Patent Application Laid-Open No. H10-133967
(Document 4)
Japanese Patent Application Laid-Open No. 2000-354127
(Document 5)
Japanese Patent Application Laid-Open No. 2001-197279

However, in the document 1, it is necessary in the terminal equipment on the transmitting side to perform dial-up connection with the server, perform a log-in process including an authentication procedure and the like, and then input a terminal equipment number of the transmission destination. Therefore, it is impossible to perform the image transmission only by inputting the telephone number as in the conventional facsimile machine.

Further, in the documents 2 and 3, it is necessary to input a mail address when the image data is transmitted via the Internet. Besides, since the image is transmitted as the electronic mail, the image data are accumulated in a server, whereby a problem that it is necessary for the receiving side to receive the image data by accessing the server according to an electronic mail reading protocol such as POP (Post Office Protocol) or the like occurs.

Furthermore, in the documents 4 and 5, it is necessary to provide a gateway dedicated for processing the protocol of ITU-T Recommendation T.38. Besides, since an ordinary telephone line is used between the terminal equipment and the Internet, transmission speed is the same as that in case of facsimile transmission utilizing a conventional telephone switching network.

Besides, the conventional communication technique has been developed independently in regard to each of a facsimile field, an IP communication field and the like, whereby there is a problem that the respective technical fields are not yet integrated adequately. For example, a user is required to be familiar independently with each of an operation specific in the facsimile machine and operations on the PC specific in various IP communication. Further, as seen from the view of manufacturing corporations which provide hardware/software, it is necessary to provide completely different software/hardware in regard to each of the facsimile field, the IP communication field and the like, although data communication in each technical field is not so different essentially. Within this meaning, it is desired to, by favorably integrating the necessary technical parts of the respective fields such as the facsimile field, the IP communication field and the like, enable the data communication which can be easily operated, is excellent in versatility, and can be easily applied inexpensively.

SUMMARY OF THE INVENTION

An object of the present invention is to solve the above conventional problems, and to be able to perform high-speed and high-reliability data communication by selecting an appropriate communication path without troublesome user operation in a communication apparatus corresponding to an analog communication path of a voice band and a network communication path.

To achieve the foregoing objects, in one embodiment, the invention provides a communication apparatus which includes IP (Internet Protocol) communication means and transmits/receives communication data to/from a destination station discriminated by a telephone number. The communication apparatus has an IP address obtaining means for obtaining an IP address of the destination station from an SIP (Session Initiation Protocol) proxy server based on the telephone number of the destination station, and a facsimile communication means for performing facsimile communication on a line switching network. A converting means converts a signal that the facsimile communication means transmits/receives into data on an IP network, and an IP network connecting means connects to the IP network. A control means controls to, if it is able to transmit/receive communication data on the IP network based on a predetermined file transmit/receive protocol, start to transmit/receive image data to/from the destination station based on the predetermined file transmit/receive protocol, via the IP network connecting means, using the obtained IP address of the destination station, in response to the acquirement of the IP address by said IP address obtaining means. But, if it is not able to transmit/receive communication data on the IP network based on the predetermined file transmit/receive protocol, the control means causes the facsimile communication means to start transmission/reception of image data to/from the destination station based on a predetermined file transmit/receive protocol, in response to the acquirement of the IP address of the destination station by the IP address obtaining means, and causes the converting means to execute conversion of the signal that the facsimile communication means transmits/receives and transmit/receive thus converted signal to/from the destination station via the IP network connecting means.

BRIEF DESCRIPTION OF THE DRAWINGS

FIG. 3 is a block diagram showing the internal structure of an ADSL gateway shown in FIG. 1;

FIG. 4 is an explanatory diagram showing a communication sequence utilizing VoIP (Voice over Internet Protocol)/SIP (Session Initiation Protocol) and for transmitting an image in IP communication;

FIG. 5 is an explanatory diagram showing a communication sequence for transmitting an image in analog communication using a voice band;

FIG. 6 is an explanatory diagram showing a communication sequence in a case where only analog communication using a voice band can be performed although a communication destination is connected to a VoIP network;

FIGS. 7A and 7B, combined as shown in FIG. 7, are flow charts showing an image transmission procedure (IP communication) according to the present invention;

FIGS. 9A and 9B, combined as shown in FIG. 9, are flow charts showing an image reception procedure (IP communication and analog communication) according to the present invention.

FIGS. 15A and 15B, combined as shown in FIG. 15, are is a flow charts showing a communication process on the image sending side.

BEST MODE FOR CARRYING OUT THE INVENTION

Embodiment 1

Hereinafter, the embodiment of the present invention will be explained in detail with reference to the attached drawings. In the following, an image communication apparatus will be shown as an example of a communication apparatus.

Figure 1:
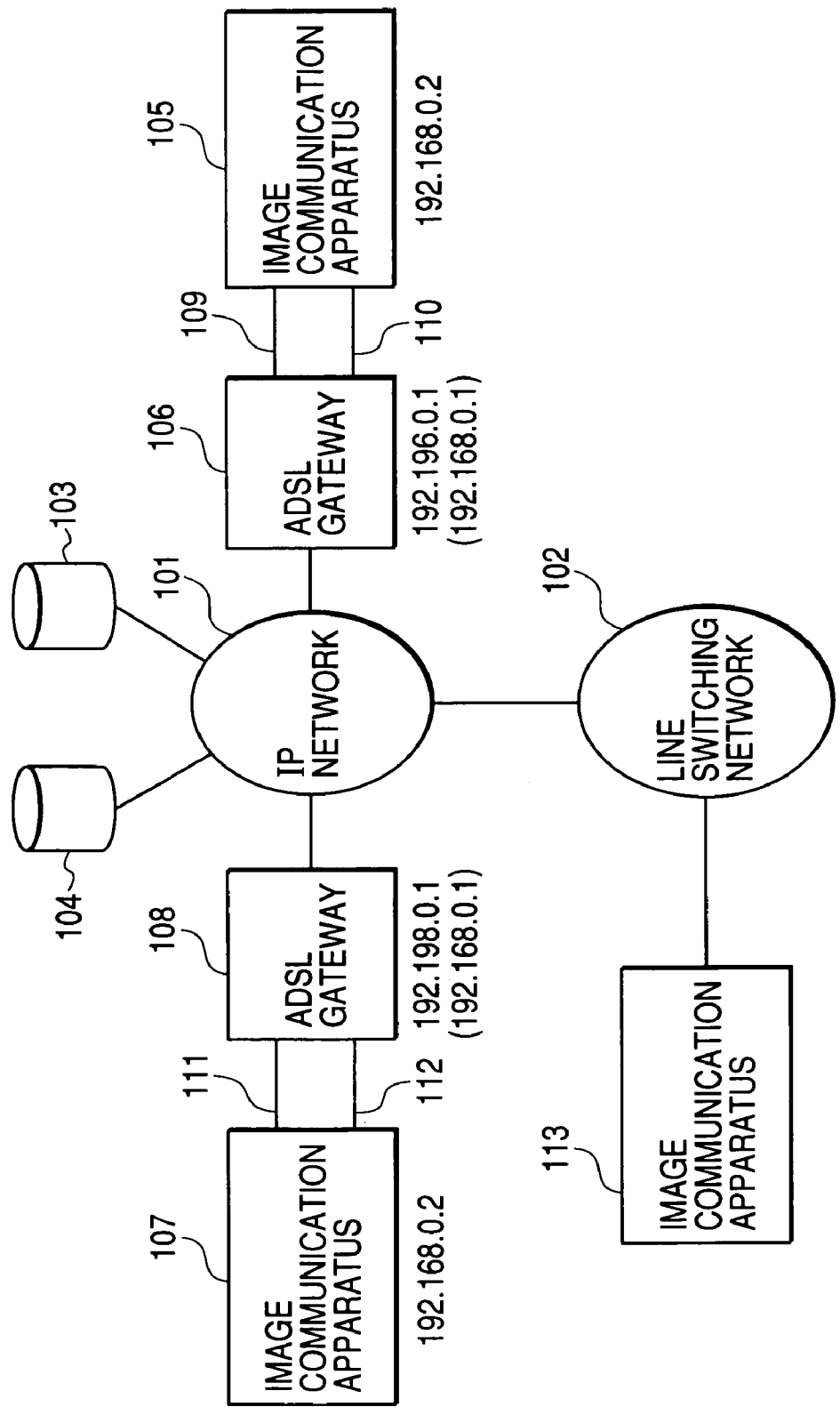
FIG. 1 is a block diagram showing the structure of a network system including an image communication apparatus which adopts the present invention.

FIG. 1 is a block diagram showing the structure of a network system to which the present invention is applicable. In FIG. 1, numeral 101 denotes an IP network, numeral 102 denotes a line switching network, numeral 103 denotes an SIP (Session Initiation Protocol) proxy server for VoIP (Voice over Internet Protocol), numeral 104 denotes a DNS (Domain Name System) server, numeral 105 denotes a first image communication apparatus (private IP address: 192.168.0.2), numeral 106 denotes an ADSL (Asymmetric Digital Subscriber Line) gateway (global IP address: 192.196.0.1, and private IP address: 192.168.0.1), numeral 107 denotes a second image communication apparatus (private IP address: 192.168.0.2), and numeral 108 denotes an ADSL gateway (global IP address: 192.198.0.1, and private IP address: 192.168.0.1). Besides, each of numerals 109 and 111 denotes an analog telephone interface, each of numerals 110 and 112 denotes a CSMA/CD (Carrier Sense Multiple Access with Collision Detector) interface, and numeral 113 denotes a third image communication apparatus. Incidentally, in the following, although the apparatuses 105, 107 and 113 will be explained respectively as the image communication apparatuses, these apparatuses are not limited to the image communication apparatus which transmits/receives image data. That is, the technique explained as below is alternatively applicable to a communication apparatus which can transmit/receive data suitable for communication using the IP network.

Although the details of the structures of the ADSL gateways 106 and 108 will be later explained in detail. The contract of the subscriber regarding these gateways is a common type contract including a telephone service and an IP communication service. Thus, the analog telephone interface 109 and the CSMA/CD interface 110 acting as the network interface are provided between the image communication apparatus 105 and the ADSL gateway 106, and similarly the analog telephone interface 111 and the CSMA/CD interface 112 acting as the network interface are provided between the image communication apparatus 107 and the ADSL gateway 108 (however, the network interface is not limited to the CSMA/CD interface).

The analog telephone interface 109 and the CSMA/CD interface 110 provided between the image communication apparatus 105 and the ADSL gateway 106, and the analog telephone interface 111 and the CSMA/CD interface 112 provided between the image communication apparatus 107 and the ADSL gateway 108, can be respectively utilized for the communication.

More specifically, the analog telephone interfaces 109 and 111 can be utilized for telephone call and analog facsimile communication based on ITU-T Recommendation T.30 (hereinafter, simply called "Recommendation T.30" or "T.30" as long as there is no confusion).

For example, a predetermined protocol such as PPPoE (Point-to-Point Protocol over Ethernet™) or the like is used on the path of the CSMA/CD interfaces 110 and 112, whereby the connection with ISP (Internet Service Provider) is established, and the global IP address on the side of WAN (wide area network) and the private IP address on the side of LAN (local area network) are determined as described above.

In such a condition, the image communication apparatuses 105 and 107 can utilize arbitrary services (e.g., services on TCP(UDP)/IP (Transmission Control Protocol (User Datagram Protocol)/Internet Protocol) such as FTP (File Transfer Protocol), HTTP (HyperText Transport Protocol) or the like, VoIP and the like) on the IP network 101.

In the present invention, the image communication apparatuses (e.g., 105 and 107 in FIG. 1) are connected to perform the communication by partially utilizing the VoIP protocol (ITU-T Recommendation H.323) and SIP (RFC (Request For Comment) 2543) on the IP network 101, thereby enabling to perform high-speed communication. By the way, the details of VoIP and SIP will be described later.

Figure 2:
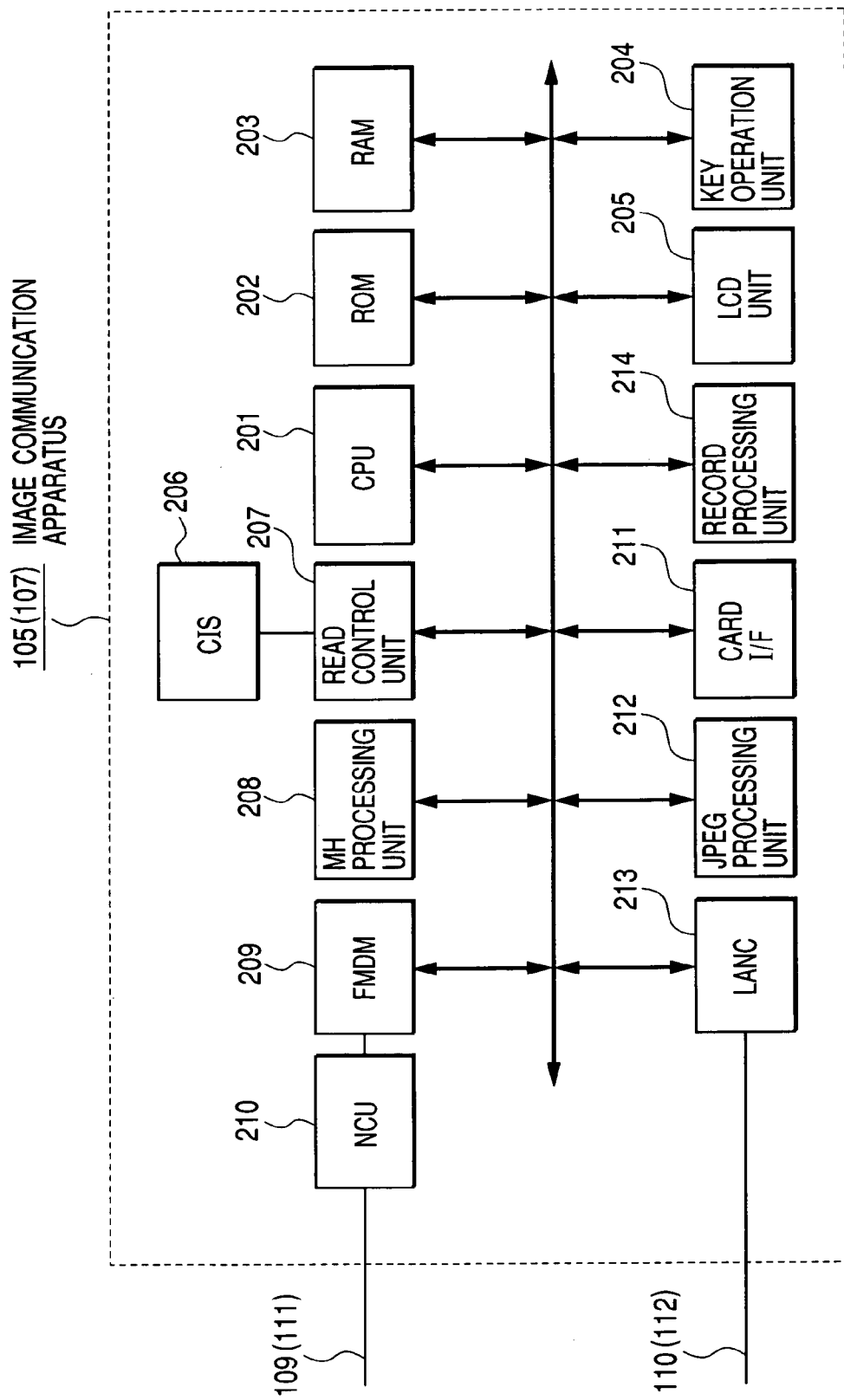
FIG. 2 is a block diagram showing the internal structure of the image communication apparatus shown in FIG. 1.

FIG. 2 is a block diagram showing the internal structure of the image communication apparatus (105 or 107 in FIG. 1) to which the present invention is applied. In FIG. 2, numeral 201 denotes a CPU which controls the image communication apparatus as a whole according to a program stored in a ROM 202. Besides, the CPU 201 performs a process of TCP/IP, whereby the image data is set up to a TCP/IP frame under the control of the CPU 201. Numeral 203 denotes a RAM which is used as a working memory when the program is executed and also used when the image data to be transmitted/received is buffered.

Numeral 204 denotes a key operation unit which consists of dials and operation buttons for facsimile transmission/reception, and numeral 205 denotes an LCD (liquid crystal display) unit.

Numeral 206 denotes a CIS (contact image sensor) which converts an original image into an analog signal, and numeral 207 denotes a read control unit which converts the analog signal output from the CIS 206 into digital data. The converted digital data is then transferred to the RAM 203 under the control of the CPU 201.

Numeral 208 denotes an MH (Modified Huffman) processing unit (MH coding and decoding processing unit) which performs data compression by performing MH coding to the read image data when the image data is transmitted, and decodes the MH coded image data when the image data is received.

Numeral 209 denotes an FMDM (facsimile modem) which modulates the MH coded data and converts into the analog signal of a voice band capable of being transferred on an analog line when the image data is transmitted. When the image data is received, the FMDM 209 demodulates the received analog signal and then outputs the MH coded data.

Numeral 210 denotes an NCU (network control unit) which includes an interface function for an analog communication line.

Numeral 211 denotes a card I/F (interface) to which a memory card storing a JPEG (Joint Photographic Experts Group) image taken by a digital camera can be connected. Here, a standard of the memory card can be arbitrarily determined, for example, a card standard according to PCMCIA (Personal Computer Memory Card International Association) may be utilized. Moreover, the data to be stored in the memory card is not limited to image data but may be data to be processed by a computer.

Numeral 212 denotes a JPEG processing unit which is used to encode (compress) another-format image data input via the card I/F into JPEG image data and decode (decompress) received JPEG image data.

Numeral 213 denotes an LANC (LAN controller) which transmits/receives the data based on the CSMA/CD protocol to/from the ADSL gateway.

Numeral 214 denotes a record processing unit which converts the received image data into print raster data and prints the converted data. Here, a record system of the record processing unit 214 can be arbitrarily determined, for example, an electrophotographic system and an ink-jet system can be used.

FIG. 3 is a block diagram showing the internal structure of the ADSL gateway (106 or 108 in FIG. 1). In FIG. 3, numeral 215 denotes a splitter which is connected to the ADSL communication line and separates a voice band signal from an out-of-voice band signal, and numeral 216 denotes an ADSL modem which has a function to be able to convert digital data into a signal of the form capable of being transmitted on the ADSL communication line.

Numeral 217 denotes a CPU which performs a packet composition/decomposition for voice and data input to the ADSL gateway, a communication procedure process to a VoIP server, and the like. Numeral 218 denotes a ROM which stores a program to operate the ADSL gateway, and numeral 219 denotes a RAM which is used when the data to be transmitted/received by the ADSL gateway is buffered and when the program is executed.

Numeral 220 denotes a CSMA/CD I/F circuit which is connected to the CSMA/CD interface 110 (112) and performs a frame composition/decomposition process when the digital data is transmitted/received to/from the image communication apparatus.

The ADSL gateway in the present embodiment also corresponds to VoIP, that is, numeral 221 denotes a voice coding process unit which performs a coding and decoding process based on a voice coding system (refer to ITU-T Recommendation G.711, G729, etc.) used in VoIP.

Numeral 222 denotes a selection switch which switches a voice bus according to whether the data is transmitted to the voice terminal equipment connected to the ADSL gateway in a voice band or as the digital data in an out-of-voice band.

Numeral 223 denotes an analog telephone I/F circuit to which the voice terminal equipment such as an analog telephone or the like is connected via the analog telephone interface 109 (111) so as to be able to transmit/receive the voice signal to/from the voice terminal equipment.

Next, communication control in the above structure will be explained. In the following, a process to be performed in a case where the image is transmitted from the first image communication apparatus 105 to the second and third image communication apparatuses 107 and 113 will be explained. Here, it is assumed that the JPEG image data taken by the digital camera is transmitted to the second image communication apparatus 107, and the image data read by a scanner is transmitted as G3 facsimile data (MH coded image) to the third image communication apparatus 113.

FIGS. 7A, 7B, 8, 9A and 9B show image transmission procedures to be executed by the image communication apparatus (105 or 107). Here, it should be noted that the procedures shown in FIGS. 7A, 7B, 8, 9A and 9B are stored in the form of control programs of the CPU 201 in the ROM 202, and thus executed by the CPU 201. However, the place where the program to achieve the communication control procedure according to the present embodiment is stored is not limited to the ROM. Moreover, in addition to the situation that the program has been stored beforehand in the ROM 202, the program may be supplied and updated via another storage medium or a network.

Figure 7B:
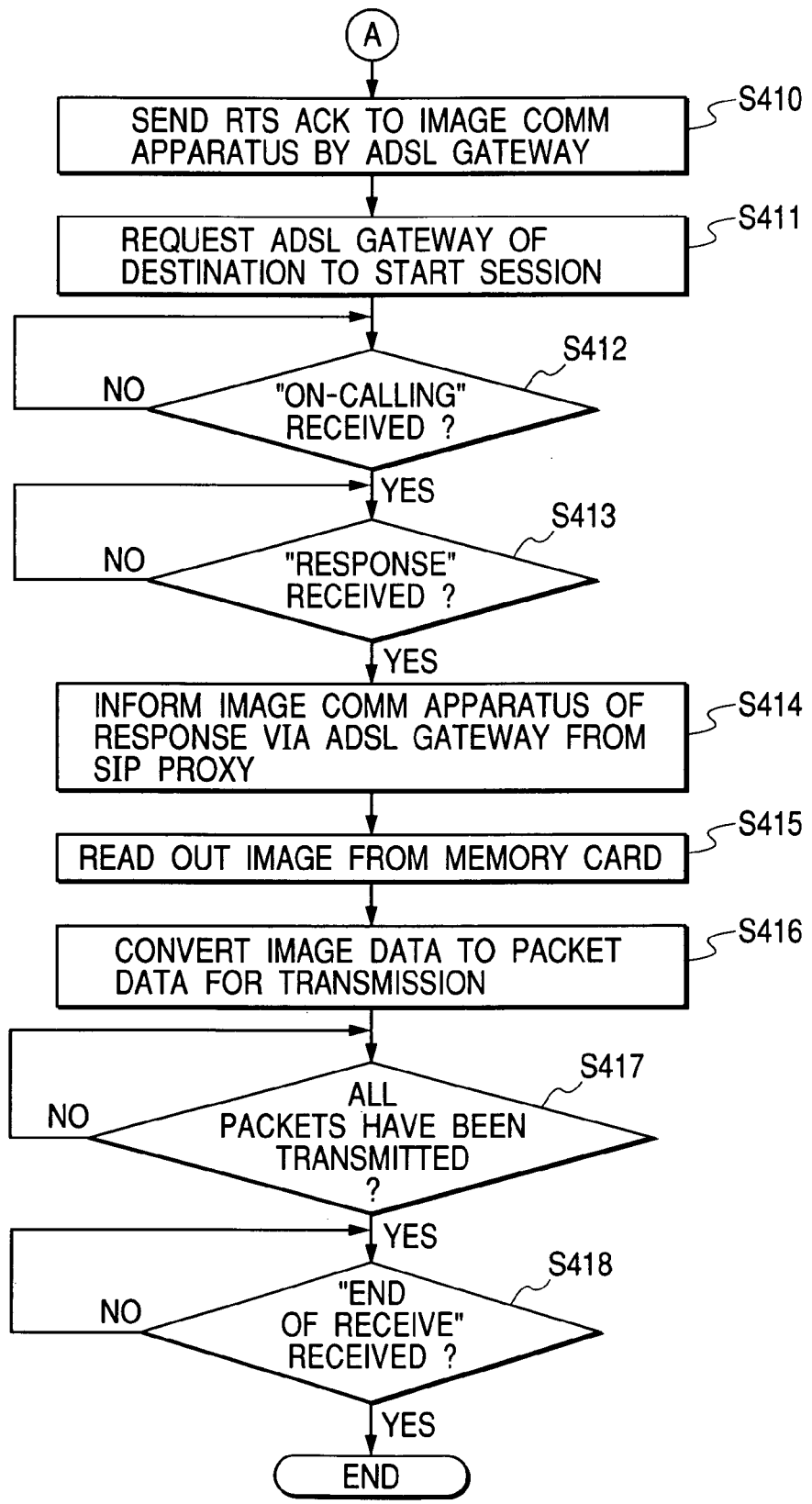
Figure 8:
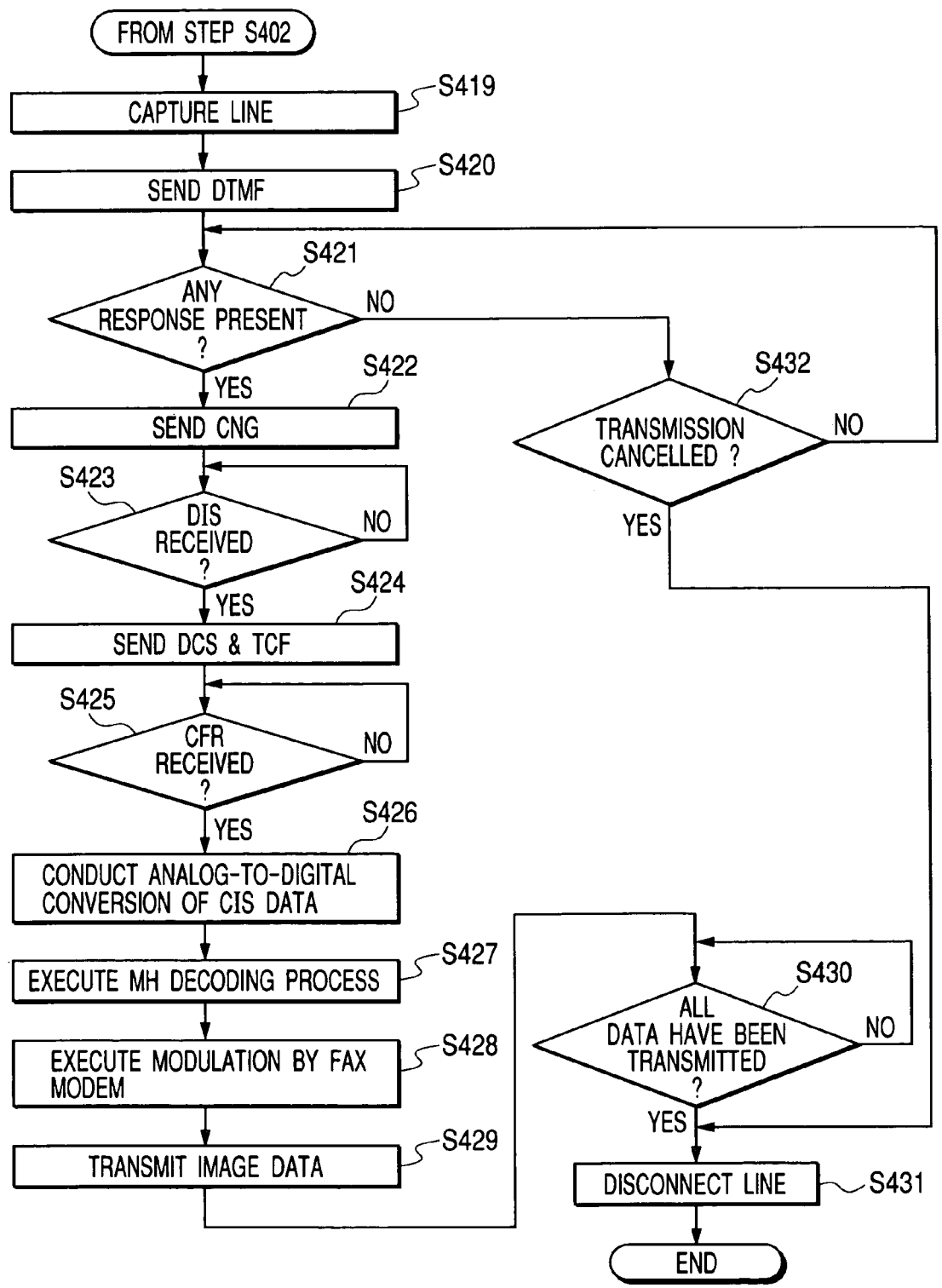
FIG. 8 is a flow chart showing an image transmission procedure (analog communication) according to the present invention.
Figure 9B:
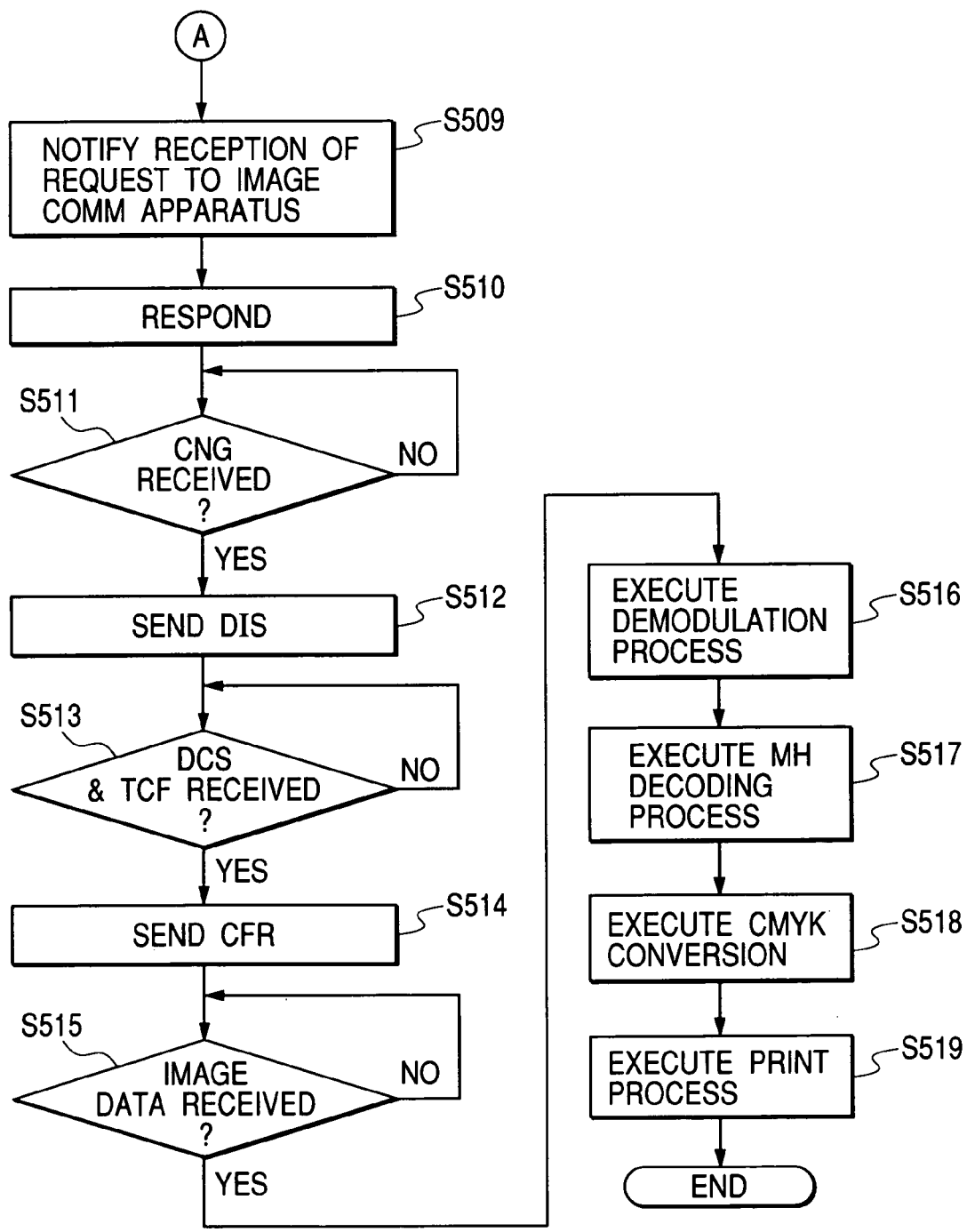

FIGS. 7A, 7B and 8 show the communication control procedure of the image communication apparatus on the transmitting side, and FIGS. 9A and 9B show the communication control procedure of the image communication apparatus on the receiving side. Moreover, FIGS. 4 to 6 show communication sequences achieved by the communication control shown in FIGS. 7A, 7B, 8, 9A and 9B, and the steps numbers shown in FIGS. 4 to 6 correspond to the respective steps shown in FIGS. 7A, 7B, 8, 9A and 9B.

When a destination is input by the key operation unit 204 of the image communication apparatus (step S401 in FIG. 7A), the input destination number is analyzed to judge whether or not the communication to the destination is performed via a VoIP network. For example, if it is assumed that a telephone number is 050-1234-5678, it is judged based on the numbers of three figures from the head that the communication is performed to the destination capable of performing the communication via the VoIP network (step S402), and the processes from a step S403 and following steps are performed. Here, it should be noted that, at the present time, the prefix "050" being the numbers of three figures from the head is determined as the number indicating a telecommunication carrier of the IP telephone using the VoIP network. However, it is needless to say that such a rule is determined in Japan, and may be changed properly when other number plans in foreign countries are applied. When it is judged that the communication is performed to the destination via no VoIP network, the later-described processes shown in FIG. 8 are performed. Here, in the above case, it is judged based on the prefix being the numbers of three figures from the head whether or not the communication is performed via the VoIP network, however, the present invention is not limited to this. That is, such a judgment may be performed based on a table where a proper judgment condition as to whether or not the destination can perform the communication via the VoIP network has been stored in regard to the telephone number of each destination.

When the destination can perform the communication via the VoIP network, the image communication apparatuses 105 and 107 communicate with each other on the IP network, without using an analog voice line, by partially using VoIP/SIP according to the communication sequence as shown in FIG. 4.

First, in a step S403 of FIG. 7A, a packet of request-to-send (RTS) including the telephone number information is sent to the ADSL gateway 106 via the CSMA/CD interface 110. In this case, the private IP address (192.168.0.1) of the ADSL gateway 106 is involved in the transmission destination address of such an RTS packet and then sent.

The ADSL gateway 106 which received the RTS packet inquires of the SIP proxy server 106 being an IP service agency as to the IP address of the destination (step S404).

Then, the SIP proxy server 106 decompresses the telephone number into URL (Uniform Resource Locater) such as "8.7.6.5.4.3.2.1.e164.arpa" (step S405), and retrieves the DNS server 104 (step S406).

The SIP proxy server 106 which received the URI of the destination ADSL gateway 108 from the DNS server 104 (step S407) converts the URI of the destination ADSL gateway 108 into the global IP address (192.198.0.1) and the port number of the destination (step S408), and sends the obtained address and number to the ADSL gateway 106 (step S409).

The ADSL gateway 106 which received the global IP address of the destination sends an RTS ACK (acknowledge) command of a predetermined format including the received IP address to the image communication apparatus 105 (step S410). Based on the RTS ACK command, the image communication apparatus 105 can know the global IP address (and other necessary parameters) of the destination.

Then, the ADSL gateway 106 which received the global IP address of the destination sends a session start request message of SIP to the ADSL gateway 108 by using the received address (step S411). The ADSL gateway 108 which received the request message (step S501 in FIG. 9A) sends a reception message to the image communication apparatus 107 (step S502 in FIG. 9A). At that time, the ADSL gateway 106 receives an on-calling message from the ADSL gateway 108 (step S412).

In a case where the image communication apparatus 107 is in the receivable state at a time when the reception message is received, the image communication apparatus 107 sends a response message to the ADSL gateway 108 (step S503 in FIG. 9A). The ADSL gateway 108 which received the response message sends it to the ADSL gateway 106 (steps S413 in FIG. 7B and S503 in FIG. 9A), whereby the response message is then sent from the ADSL gateway 106 to the image communication apparatus 105 (step S414). Here, it should be noted that the response message includes the IP address and the port number information of the ADSL gateway 108 of the destination.

Incidentally, the IP telephone protocol (VoIP) of communicating a voice packet is used in the calling process until now. Ordinarily, in the voice communication as in VoIP, UDP (User Datagram Protocol) is used because a real-time response is thought to be more important than data reliability. Besides, ordinarily, in the IP telephone protocol (VoIP), it is assumed that the voice communication is performed hereafter, whereby UDP suitable for the voice packet communication is successively used.

By the above steps S401 to S414 and the sequence to be executed in these steps as shown at the upper half of FIG. 4, the image communication apparatus 105 and the image communication apparatus 107 can be connected to each other by a socket API (Application Programming Interface) corresponding to the predetermined port number on TCP(or UDP)/IP, whereby it is possible to start the data transmission/reception between the apparatuses 105 and 107.

In the image communication apparatus 105, the image data is set up to the TCP/IP frame and sent, and the IP address of the ADSL gateway 108 is added as the destination address. In regard to the TCP/IP packet sent to the ADSL gateway 108 via the ADSL gateway 106 and the IP network 101, the destination address is converted into the private IP address of the image communication apparatus 107 by the ADSL gateway 108. Then, this packet is sent to the image communication apparatus 107. In this image communication, justifiably the CSMA/CD interface 112 is used between the image communication apparatus 107 and the ADSL gateway 108.

At this time, an arbitrary protocol can be used as a file transfer protocol corresponding to the upper layer of TCP/IP used for the image data sending. More specifically, generally used FTP (File Transfer Protocol) or HTTP (HyperText Transport Protocol), a system to which these protocols are applied (also including a dedicated system, the encrypted version of FTP or HTTP, a protocol such as IPP (Internet Printing Protocol) or IPPFAX based on HTTP defined by IEEE (Institute of Electrical and Electronic Engineers), etc.) and the like can be used.

Prior to the image data sending, the image communication apparatus 105 sends an image RTS (request-to-send) message to the image communication apparatus 107. Then, when an image send permission message is received from the image communication apparatus 107, the image communication apparatus 105 initiates the file transfer protocol to start the image send process.

At the stage that it is decided to perform the image communication, it is preferable to perform the subsequent image send process by switching UDP utilized in VoIP/SIP until now with attaching importance to real-time communication of the packet data, to TCP with attaching importance to reliability of the packet data, and by using the port number capable of executing TCP. Here, UDP may be switched to TCP at either a timing when the image send permission message is received and the image communication is established as described above or a timing after the response message was notified to the image communication apparatus 105 as in the step S414. In this manner, when it intends to send the image, the image RTS message is sent prior to the transmission of the image data, whereby it is possible to accurately notify the destination whether the telephone call is desired or the image communication is desired, and it is also possible to select the protocol suitable for voice communication/image communication.

In the image communication apparatus 105, the CPU 201 reads the JPEG data stored in the memory card via the card I/F 211 (step S415), and transfers the read data to the LANC 213. In the LANC 213, the data of a determined amount are packeted, the obtained packet is added to the header, and then the image data is transmitted to the destination of the previously received global IP address (192.198.0.1) of the ADSL gateway 108 (step S416).

The ADSL gateway 108 which received the image data transfers the received data to the image communication apparatus 107 after converting the IP address as described above. Then, the image communication apparatus 107 which received the image data deletes the header thereof in the LANC 213 and stores the JPEG data in the RAM 203 (step S504 in FIG. 9A).

When all the JPEG data are sent from the image communication apparatus 105 to the image communication apparatus 107 (step S417 in FIG. 7B), the image communication apparatus 107 sends an end-of-receive message to the image communication apparatus 105 (step S505 in FIG. 9A), and the image sending ends (step S418).

In the image communication apparatus 107, the received JPEG data is decompressed in the JPEG processing unit 212 (step S506 in FIG. 9A), the decompressed data is converted into four color data of C, M, Y and K in the record processing unit 214 (step S507), and the converted color data is printed and output by the printer unit (step S508).

By the above procedure, high-speed image sending can be achieved. Here, if it is assumed that the data size of the JPEG image taken by the digital camera is 300 KB and an upload send speed of the ADSL line is 1 Mbps, a time required for data sending is at longest about 300K÷(1000K÷8)=2.4 seconds.

In the above, it is thought that the image of JPEG format is sent between the image communication apparatuses 105 and 107. However, it is needless to say that an image file (also non-image data) of G3 format or TIFF (Tag Image File Format)/G3 format can be naturally sent under substantially the same communication control as above. When it is thought that the image of G3 format is sent, a send speed on the analog communication path is only 56 Kbps or so in maximum. Moreover, in fact, it is thought that the effective speed is further lowered due to execution of T.30 protocol. Thus, if the above communication procedure is used to send the image of G3 format, it is possible to remarkably increase the facsimile communication speed. Incidentally, when the data of G3 format (or data of another format) is received, it is needless to say that the processes on the receiving side shown in the steps S505 to S508 of FIG. 9A should be of course replaced by the following processes, that is, the received data of G3 format (or data of another format) is decoded (S506), a process such as color conversion or the like is performed to the decoded data if necessary (S507), and the processed data is reproduced (S508).

On one hand, when it is judged in the step S402 that the destination number is not communicated via the VoIP network, for example, when the destination number is "03-1234-5678", it is judged based on the numbers of three figures from the head that the communication is to be performed to the destination (e.g., image communication apparatus 113) via the line switching network, and the line of the analog telephone interface 109 of the ADSL gateway 106 is captured (step S419). Subsequently, a DTMF (Dial Tone Multi Frequency) signal corresponding to the telephone number is sent to the ADSL gateway 106 via the analog telephone interface 109 (step S420). Then, the ADSL gateway 106 sends the DTMF signal corresponding to the destination number onto a voice band channel, and there is set up the connection to the line switching network 102 via a gateway (not shown) of a VoIP service agency. Alternatively, when there is set up the direct connection from the ADSL gateway 106 to the line switching network 102, the following processes are the same.

When the connection to the line switching network is set up, the same facsimile communication as that based on conventional Recommendation T.30 is performed according to the sequence shown in FIG. 5. That is, the reception notification is first performed to the image communication apparatus 113 being the destination terminal equipment. When a response is sent from the image communication apparatus 113 (step S421), the ADSL gateway 106 notifies the image communication apparatus 105 of the sent response by reversing the polarity of the analog signal interface connected to the image communication apparatus 105. After that, the communication based on the facsimile communication procedure (T.30) is started (step S421).

The image communication apparatus 105 sends a CNG (calling tone) (step S422), and the image communication apparatus 113 which received the CNG sends a DIS (digital identification signal). Then, the image communication apparatus 105 which received the DIS (step S423) sends a DCS (digital command signal) and a TCF (training check field) (step S424), and the image communication apparatus 113 which received the DCS and TCF sends a CFR (confirmation to receive).

When the image communication apparatus 105 receives the CFR (step S425), the image data sending is started. In the image data sending, the A/D (analog-to-digital) conversion is conducted to the analog signal input from the CIS 206 as an original is being transported under the control of the read control unit 207 (step S426), and the MH coding process is executed to the converted image data by the MH processing unit 208 (step S427), whereby the data compression is executed. Subsequently, the MH coded image data is input and modulated into the analog signal in the FMDM 209 (step S428), and the modulated signal is sent to the ADSL gateway 106 via the NCU 210 (step S429).

In the ADSL gateway 106, the signal which was input via the analog telephone interface 109 is sent to the communication line as it is by using the voice band channel, and further sent to the image communication apparatus 113 via the line switching network 102. Then, in the image communication apparatus 113, the received image data is demodulated by the FMDM 209, decoded by the MH processing unit 208, converted into the four color data of C, M, Y and K by the record processing unit 214, and printed and output by the printer unit. The above reception process is substantially the same as that in and after a step S509 later described.

On one hand, a process to be performed in a case where facsimile sending is performed from the image communication apparatus 113 which does not have any means for connecting with the IP network and thus can connect with only the line switching network 102 to the image communication apparatus 105 (or 107) will be explained. In this case, the image communication apparatus 105 performs the processes subsequent to the steps S501 to S509 in FIGS. 9A and 9B as the receiving-side apparatus.

In the image communication apparatus 113, when a dial call to the image communication apparatus 105 is executed, the ADSL gateway 106 which received the dial call notifies the image communication apparatus 105 of the reception of the dial call, via the analog telephone interface 109 (step S509 in FIG. 9B). Then, when the image communication apparatus 105 responds to the notification (step S510), the image communication apparatus 113 recognizes the response from the image communication apparatus 105 by recognizing the reverse of polarity, and then starts the image data sending according to the facsimile communication procedure of T.30.

First, the image communication apparatus 113 sends a CNG, and the image communication apparatus 105 which received the CNG (step S511) sends a DIS (step S512). Then, the image communication apparatus 113 which received the DIS sends a DCS and a TCF, and the image communication apparatus 105 which received the DCS and TCF (step S513) sends a CFR (step S514).

When the image communication apparatus 113 receives the CFR, the image data sending is started. In the image data sending, the A/D conversion is conducted to the analog signal input from the CIS 206 as an original is being transported under the control of the read control unit 207, and the MH coding process is executed to the converted image data by the MH processing unit 208. Subsequently, the MH coded image data is input and modulated into the analog signal in the FMDM 209, the modulated signal is sent to the communication line via the NCU 210, and the data is further sent to the ADSL gateway 108 via the IP network 101.

In the image communication apparatus 105 which received the image data via the ADSL gateway 108 (step S515), the received image data is demodulated by the FMDM 209 (step S516), decoded by the MH processing unit 208 (step S517), converted into the four color data of C, M, Y and K by the record processing unit 214 (step S518), and printed and output by the printer unit (step S519).

As above, according to the present embodiment, on the IP network, the image communication apparatus 105 can transmit/receive at high speed the image data to/from the image communication apparatus having the function of connecting with the VoIP network, without using the analog communication path. Besides, the image communication apparatus 105 can transmit/receive the image to/from the conventional image communication apparatus only having the facsimile function according to the facsimile communication procedure.

In the image communication on the IP network according to the present embodiment, by partially utilizing the SIP protocol used in the VoIP network, it is possible to know the IP address and the port number of the destination and send the image data at high speed by using specific services (HTTP, FTP, etc.) on TCP(or UDP)/IP.

Furthermore, the user on the transmitting side only has to input the telephone number to designate the destination and does not need to perform other troublesome operations. That is, only by inputting the prefix of the telephone number, it is possible to designate whether or not to send the image to the destination via the VoIP network.

In the present embodiment, the image data is sent to the image communication apparatus 107 connected to the VoIP network in the form of packet by using the specific services (HTTP, FTP, etc.) on TCP(or UDP)/IP via the CSMA/CD interface 110. However, it is assumed that the image communication apparatus connected to the VoIP network is the terminal equipment only having the conventional facsimile communication function. For example, it is assumed that the ADSL gateway 108 and the image communication apparatus 107 are interconnected by only the analog telephone interface 111.

In such a case, the image communication apparatus 105 sends the facsimile image via the analog telephone interface 111 according to the conventional facsimile procedure because it is impossible to perform the IP communication via the CSMA/CD interface 110.

FIG. 6 shows a communication sequence in this case. In FIG. 6, an RTS (request-to-send) operation by the image communication apparatus 105 is performed in the same manner as for the sequence shown in FIG. 4. However, when the ADSL gateway 108 calls the image communication apparatus 107, the image communication apparatus 107 confirms that it is not connected to the CSMA/CD interface and then notifies, in a response message, the image communication apparatus 105 that the image communication apparatus 107 is the terminal equipment connected only by the analog telephone interface.

Thus, after this, the image communication apparatus 105 sends to the image communication apparatus 107 the image according to the same facsimile procedure of Recommendation T.30 as that in the conventional facsimile communication as shown in FIG. 6. Here, it should be noted that the facsimile communication according to Recommendation T.30 is performed in the form of analog communication using the voice band. In this case, the VoIP network may be used, or the line switching network 102 may be used as described above. However, when the VoIP network is used, the account proportional to the communication distance can be evaded, whereby it is advantageous in communication costs. Here, in the actual communication, it is needless to say that the transmitting side (image communication apparatus 105) is controlled by the procedure same as that shown in FIG. 8 and the receiving side (image communication apparatus 107) is controlled by the procedure same as in and after the step S509 shown in FIG. 9B.

In the above embodiment, that the image is sent by the procedure same as the convention facsimile procedure because the image communication apparatus 107 on the receiving side notifies, in the response message, the image communication apparatus 105 that the image communication apparatus 107 is the terminal equipment connected only by the analog telephone interface. However, the present invention is not limited to this, that is, the image may be sent according to the conventional facsimile procedure as described below. That is, in the above explanation, the image communication apparatus 105 sends the image RTS message to the image communication apparatus 107 after receiving the response message and before sending the actual image data. On one hand, when the image communication apparatus 105 does not receive the image send permission message from the image communication apparatus 107, the image communication apparatus 105 sends the image according to the conventional facsimile procedure by using the voice band. Thus, it is possible to absolutely perform the communication even with the apparatus which cannot understand the protocol according to the present invention but can merely perform the conventional facsimile communication.

In the above embodiment, it is supposed that dial information is notified to the ADSL gateway via the CSMA/CD interface when the image is sent from the image communication apparatus 105 to the image communication apparatus 107. However, such dial information may be notified to the ADSL gateway in the form of DTMF signal by utilizing the analog telephone interface.

Moreover, in the above embodiment, the image communication apparatus (105, 107) and the ADSL gateway (106, 108) are assumed as the physically independent apparatuses. However, the same effect as above can be obtained even if the ADSL gateway and the image communication apparatus are unified. That is, by unifying the ADSL gateway and the image communication apparatus, it becomes unnecessary to exchange commands between the ADSL gateway and the image communication apparatus because the ADSL gateway and the image communication apparatus are connected by a dedicated bus or the like without using CSMA/CD interface, and it is thus possible to increase communication efficiency.

Moreover, in addition to the above structure of "ADSL modem+splitter", a router or the like for sharing the IP connection with another network terminal equipment may be unified as the structure of the line interface portion shown as the ADSL gateway in the above embodiment. Besides, the function as the gate keeper for VoIP and the function as the facsimile gateway of Recommendation T.38 may be included in the line interface portion shown as the ADSL gateway.

Moreover, in the above, the ADSL service is supposed as the network communication service. However, the technique of the present invention, particularly the transfer technique that VoIP/SIP is utilized in the former half of the communication, and FTP, HTTP or the like is utilized in the latter half of the communication, is not limited to the ADSL service. That is, the technique of the present invention can be executed likewise in other networks such as an FTTH (Fiber To The Home) network, an ATM (Asynchronous Transfer Mode) network and the like if these networks are in the network communication environments capable of utilizing VoIP/SIP. Even when the networks such as the FTTH network, the ATM network and the like different from the ADSL network is utilized, it is only necessary to change the network interface (ADSL modem 216 in FIG. 2) on the WAN side to the interface suitable for the utilized network, that is, other structures may be the same as those shown in the above embodiment. Besides, when it is necessary to execute fall back to the analog communication (FIG. 6), the technique of the present invention can be executed likewise if there is an analog communication means of some kind in addition to the IP communication means between the line interface (ADSL gateway in the above case) and the image communication means (image communication apparatus in the above case).

Moreover, in the above, the example that the image data is sent from the calling side is explained. However, it is needless to say that the procedure of the present invention can be used even in a case where the image data is sent in the opposite direction, that is, polling sending/receiving is performed. Particularly, when the IP communication is performed in the latter half of the communication, the procedure of the present invention can be easily achieved by using the file transmit/receive protocol (such as FTP) which supports bi-directional transfer. Besides, when the analog communication path is utilized, it only has to perform ordinary polling communication defined according to Recommendation T.30.

As apparent from the above explanation, according to the present invention, in the communication apparatus which includes the IP communication means and transmits/receives the data to/from the destination station discriminated by the telephone number, the control method of the communication apparatus, and the control program for the communication apparatus, the structure of (1) obtaining the IP address of the destination station from the predetermined server based on the telephone number of the destination station, and (2) transmitting/receiving the communication data on the IP network to/from the destination station, based on the predetermined file transmit/receive protocol by using the obtained IP address of the destination station is adopted, whereby it is possible to obtain the beneficial effect that it enables to perform high-speed and high-reliability data communication without requiring any troublesome user operation.

In addition, the structure of transmitting/receiving the communication data to/from the destination station by using the voice band via the analog communication path established on the line switching network or the IP network when it is impossible to transmit/receive the communication data on the IP network based on the predetermined file transmit/receive protocol is adopted, whereby it is possible to obtain the beneficial effect that it enables to select the appropriate communication path from either the analog communication path of the voice band or the network communication path and perform high-speed and high-reliability communication without requiring any troublesome user operation.

Embodiment 2

Hereinafter, the embodiment of the present invention will be explained in detail with reference to the attached drawings. In the following, an image communication apparatus will be shown as an example of a communication apparatus.

Figure 10:
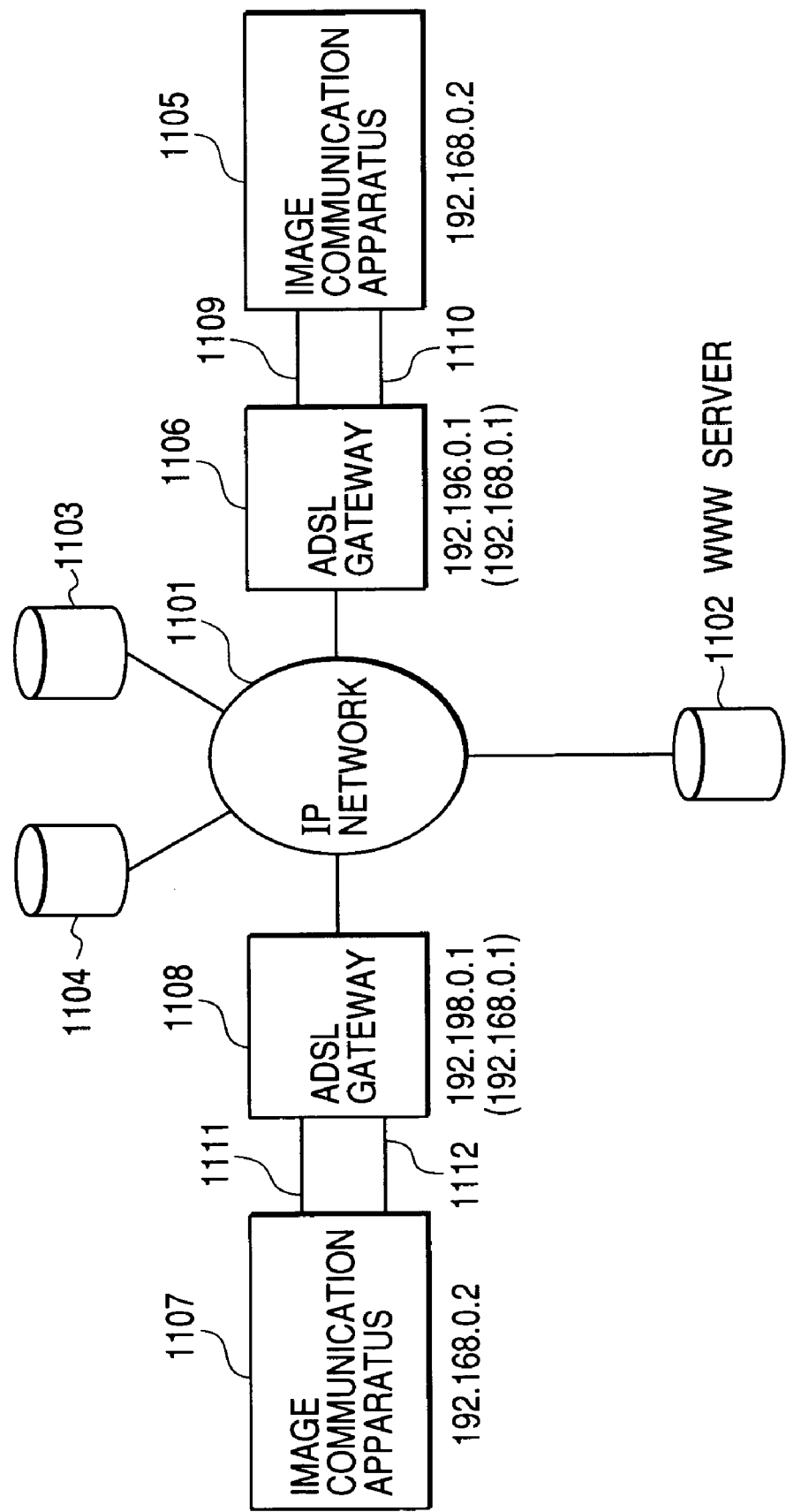
FIG. 10 is a block diagram showing the structure of a network system including an image communication apparatus which adopts the present invention.

FIG. 10 is a block diagram showing the structure of a network system to which the present invention is applicable. In FIG. 10, numeral 1101 denotes an IP network, numeral 1102 denotes a WWW (World Wide Web) server (HTTP server), numeral 1103 denotes an SIP (Session Initiation Protocol) proxy server for a VoIP (Voice over Internet Protocol), numeral 1104 denotes a DNS (Domain Name System) server, numeral 1105 denotes a first image communication apparatus (private IP address: 192.168.0.2), numeral 1106 denotes an ADSL (Asymmetric Digital Subscriber Line) gateway (global IP address: 192.196.0.1, and private IP address: 192.168.0.1), numeral 1107 denotes a second image communication apparatus (private IP address: 192.168.0.2), and numeral 1108 denotes an ADSL gateway (global IP address: 192.198.0.1, and private IP address: 192.168.0.1). Besides, each of numerals 1109 and 1111 denotes an analog telephone interface, and each of numerals 1110 and 1112 denotes a CSMA/CD (Carrier Sense Multiple Access with Collision Detector) interface. Incidentally, in the following, although the apparatuses 1105 and 1107 will be explained respectively as the image communication apparatuses, these apparatuses are not limited to the image communication apparatus which sends/receives image data. That is, the technique explained as below is alternatively applicable to a communication apparatus which can send/receive data suitable for communication using the IP network.

Although the details of the structures of the ADSL gateways 1106 and 1108 will be later explained in detail. The contract of the subscriber regarding these gateways is a common type contract including a telephone service and an IP communication service. Thus, the analog telephone interface 1109 and the CSMA/CD interface 1110 acting as the network interface are provided between the image communication apparatus 1105 and the ADSL gateway 1106, and similarly the analog telephone interface 1111 and the CSMA/CD interface 1112 acting as the network interface are provided between the image communication apparatus 1107 and the ADSL gateway 1108 (however, the network interface is not limited to the CSMA/CD interface).

The analog telephone interface 1109 and the CSMA/CD interface 1110 provided between the image communication apparatus 1105 and the ADSL gateway 1106 and the analog telephone interface 1111 and the CSMA/CD interface 1112 provided between the image communication apparatus 1107 and the ADSL gateway 1108 can be respectively utilized for the communication.

More specifically, the analog telephone interfaces 1109 and 1111 can be utilized for telephone call and analog facsimile communication based on ITU-T Recommendation T.30 (hereinafter, simply called "Recommendation T.30" or "T.30" as long as there is no confusion). Incidentally, the signals supplied from the analog telephone interfaces 1109 and 1111 are respectively routed from a station switching equipment to a not-shown line switching network.

For example, a predetermined protocol such as a PPPoE (Point-to-Point Protocol over Ethernet™) or the like is used on the path of the CSMA/CD interfaces 1110 and 1112, whereby the connection with ISP (Internet Service Provider) is established, and the global IP address on the side of WAN (wide area network) and the private IP address on the side of LAN (local area network) are determined as described above. In such a condition, the image communication apparatuses 1105 and 1107 can utilize arbitrary services (e.g., services on TCP(UDP)/IP (Transmission Control Protocol (User Datagram Protocol)/Internet Protocol) such as an FTP (File Transfer Protocol), an HTTP (HyperText Transport Protocol), the VoIP and the like) on the IP network 1101.

In the present invention, the image communication apparatuses (e.g., 1105 and 1107 in FIG. 10) are connected to perform the communication by partially utilizing the VoIP (ITU-T Recommendation H.323) and an SIP (RFC (Request For Comment) 2543) on the IP network 1101, thereby enabling to perform high-speed communication. By the way, the details of the VoIP and the SIP used in the present invention will be described later.

Figure 11:
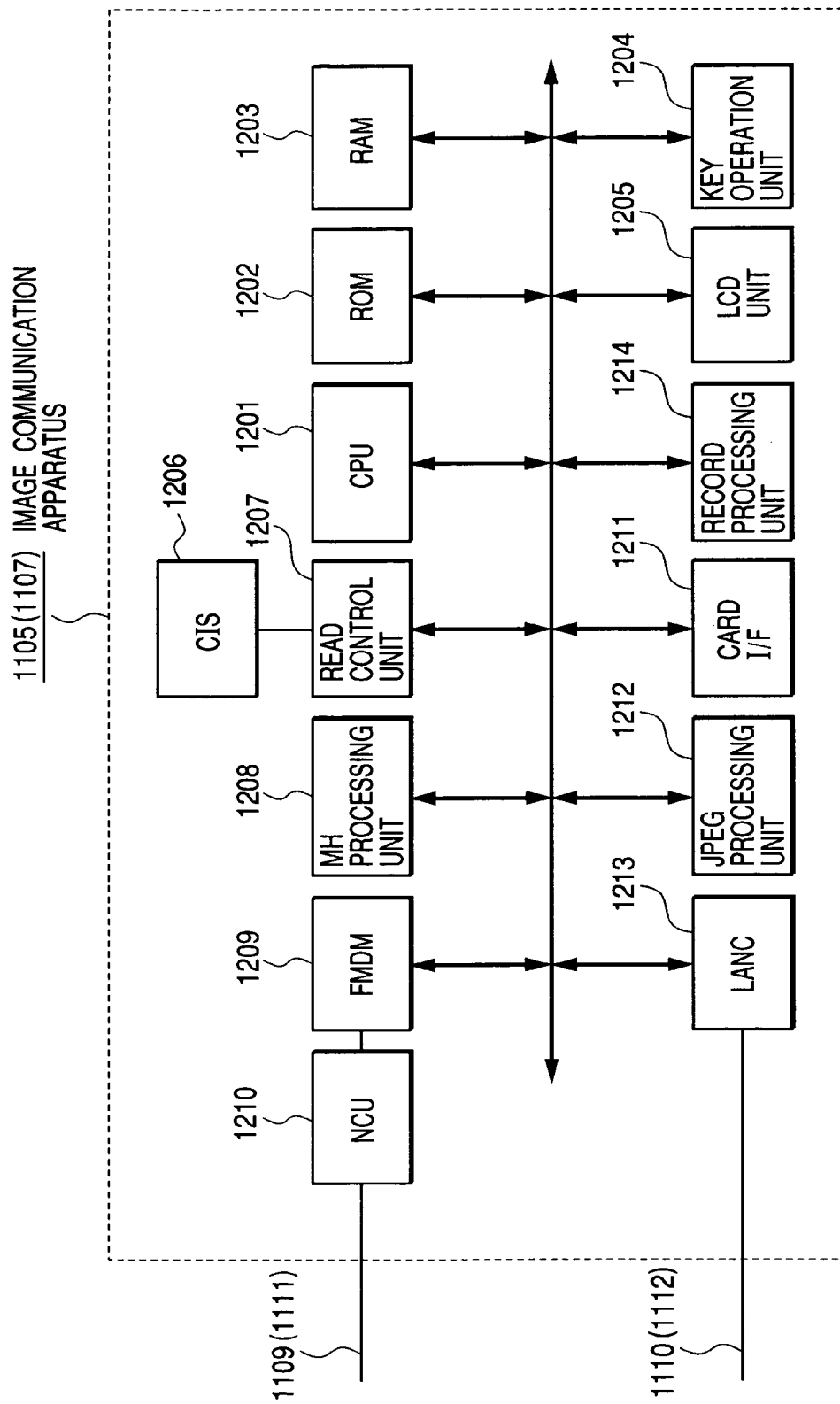
FIG. 11 is a block diagram showing the internal structure of the image communication apparatus shown in FIG. 10.

FIG. 11 is a block diagram showing the internal structure of the image communication apparatus (1105 or 1107 in FIG. 10) to which the present invention is applied. In FIG. 11, numeral 1201 denotes a CPU which controls the image communication apparatus as a whole according to a program stored in a ROM 1202. Besides, the CPU 1201 performs a process of the TCP/IP, whereby the image data is set up to a TCP/IP frame under the control of the CPU 1201. Numeral 1203 denotes a RAM which is used as a working memory when the program is executed and also used when the image data to be sent/received is buffered.

Numeral 1204 denotes a key operation unit which consists of dials and operation buttons for facsimile sending/reception, and numeral 1205 denotes an LCD (liquid crystal display) unit.

Numeral 1206 denotes a CIS (contact image sensor) which converts an original image into an analog signal, and numeral 1207 denotes a read control unit which converts the analog signal output from the CIS 1206 into digital data. The converted digital data is then transferred to the RAM 1203 under the control of the CPU 1201.

Numeral 1208 denotes an MH (Modified Huffman) processing unit (MH coding and decoding processing unit) which performs data compression by performing MH coding to the read image data when the image data is sent, and decodes the MH coded image data when the image data is received.

Numeral 1209 denotes an FMDM (facsimile modem) which modulates the MH coded data and converts into the analog signal of a voice band capable of being transferred on an analog line when the image data is sent. When the image data is received, the FMDM 1209 demodulates the received analog signal and then outputs the MH coded data.

Numeral 1210 denotes an NCU (network control unit) which is connected to the analog telephone interface 1109 (1111) as an interface for an analog communication line.

Numeral 1211 denotes a card I/F (interface) to which a memory card storing a JPEG (Joint Photographic Experts Group) image taken by a digital camera can be connected. Here, a standard of the memory card can be arbitrarily determined, for example, a card standard according to PCMCIA (Personal Computer Memory Card International Association) may be utilized.

Numeral 1212 denotes a JPEG processing unit which is used to encode (compress) another-format image data input via the card I/F into JPEG image data and decode (decompress) received JPEG image data.

Numeral 1213 denotes an LANC (LAN controller) which is connected to the CSMA/CD interface 1110 (1112) and sends/receives the data based on a CSMA/CD protocol to/from the ADSL gateway.

Numeral 1214 denotes a record processing unit which converts the received image data into print raster data and prints the converted data. Here, a record system of the record processing unit 1214 can be arbitrarily determined, for example, an electrophotographic system and an ink-jet system can be used.

Figure 12:
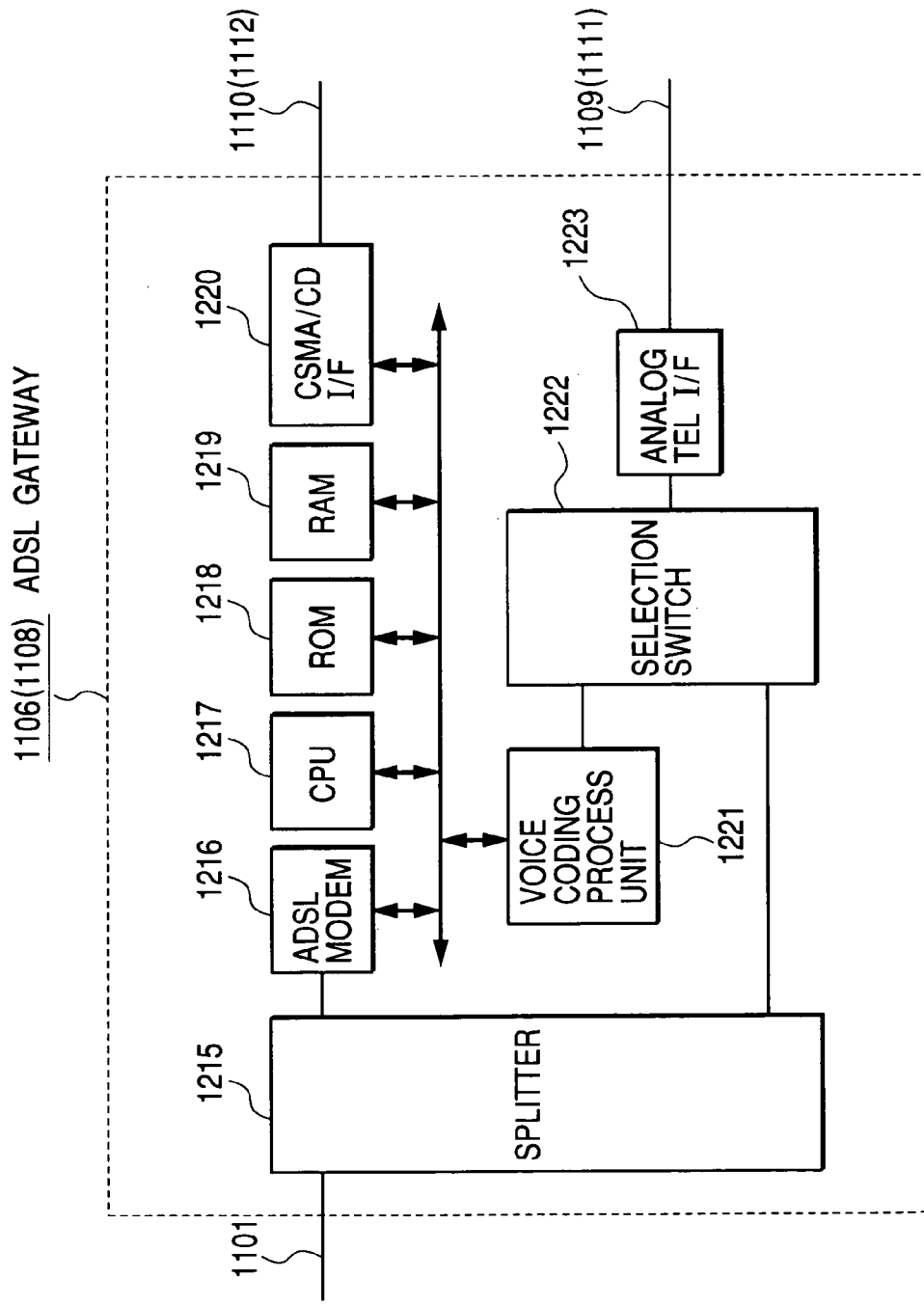
FIG. 12 is a block diagram showing the internal structure of an ADSL gateway shown in FIG. 10.

FIG. 12 is a block diagram showing the internal structure of the ADSL gateway (1106 or 1108 in FIG. 10). In FIG. 12, numeral 1215 denotes a splitter which is connected to the ADSL communication line and separates a voice band signal from an out-of-voice band signal, and numeral 1216 denotes an ADSL modem which has a function to be able to convert digital data into a signal of the form capable of being sent on the ADSL communication line.

Numeral 1217 denotes a CPU which performs a packet composition/decomposition for voice and data input to the ADSL gateway, a communication procedure process to a VoIP server, and the like. Numeral 1218 denotes a ROM which stores a program to operate the ADSL gateway, and numeral 1219 denotes a RAM which is used when the data to be sent/received by the ADSL gateway is buffered and when the program is executed.

Numeral 1220 denotes a CSMA/CD I/F which performs a frame composition/decomposition process when the digital data is sent/received to/from the image communication apparatus. The CSMA/CD I/F 1220 is connected to the CSMA/CD interface 1110 (1112).

The ADSL gateway in the present embodiment also corresponds to the VoIP, that is, numeral 1221 denotes a voice coding process unit which performs a coding and decoding process based on a voice coding system (refer to ITU-T Recommendation G.711, G.729, etc.) used in the VoIP.

Numeral 1222 denotes a selection switch which switches a voice bus according to whether the data is sent to the voice terminal equipment connected to the ADSL gateway in a voice band or as the digital data in an out-of-voice band.

Numeral 1223 denotes an analog telephone I/F to which the voice terminal equipment such as an analog telephone or the like can be connected so as to be able to send/receive the voice signal to/from the voice terminal equipment. The analog telephone I/F 1223 is connected to the above analog telephone interface 1109 (1111).

Next, communication control in the above structure will be explained. In the following, a process to be performed in a case where the image is sent from the first image communication apparatus 1105 to the second image communication apparatus 1107 and a process to be performed in a case where the second image communication apparatus downloads the image from the WWW server 1102 will be explained. Incidentally, in the present embodiment, a case where the image to be sent is represented by the image data of JPEG format (e.g., JPEG image data taken by a digital camera) will be mainly explained.

Next, the operations by the above structure will be explained.

Figure 15B:
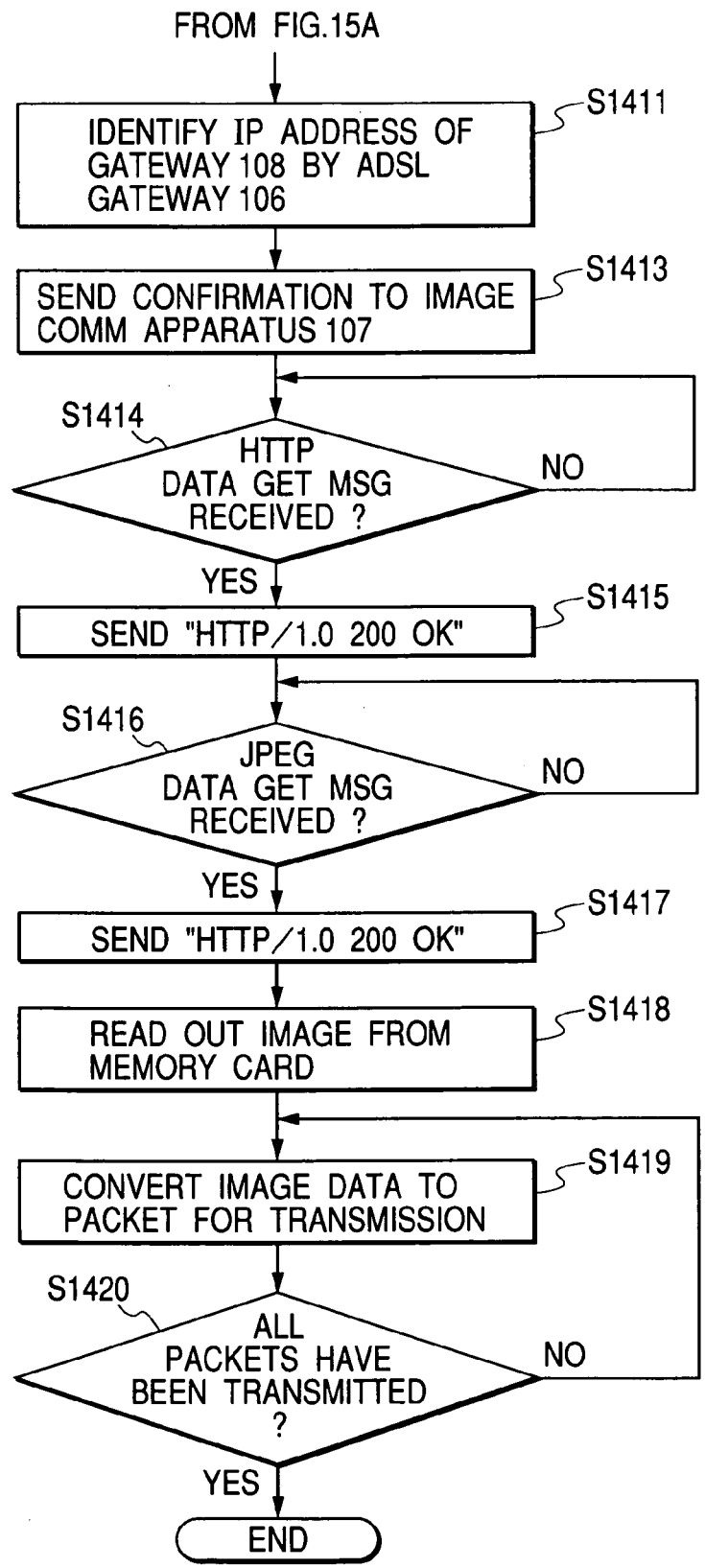
Figure 16:
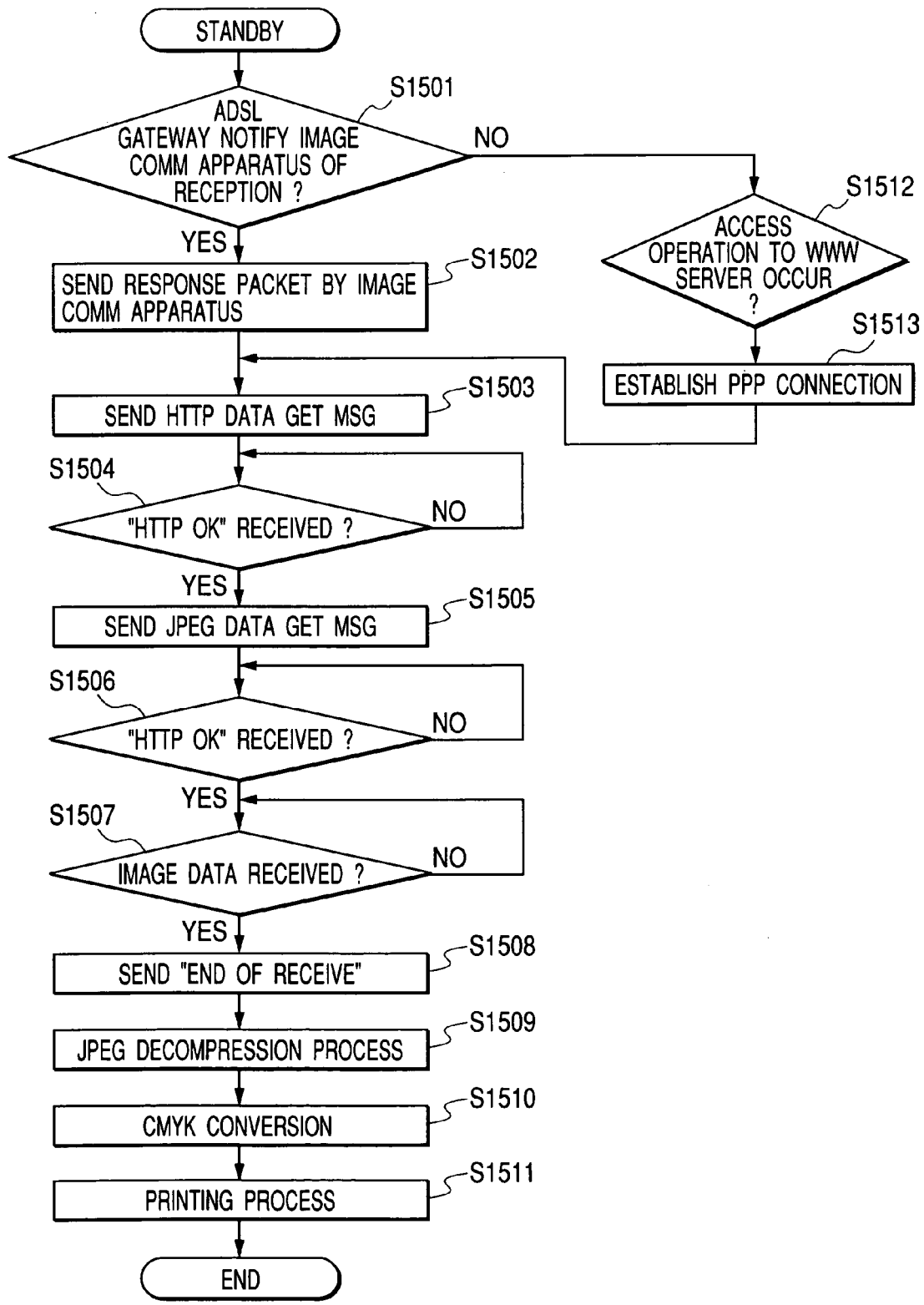
FIG. 16 is a flow chart showing a communication process and a data receiving process according to the HTTP on the image receiving side.

FIGS. 15A, 15B and 16 show communication control procedures to be executed by the image communication apparatus (1105 or 1107). Here, it should be noted that the procedures shown in FIGS. 15A, 15B and 16 are stored in the form of control programs of the CPU 1201 in the ROM 1202, and thus executed by the CPU 1201. However, the place where the program to achieve the communication control procedure according to the present embodiment is stored is not limited to the ROM. Moreover, in addition to the situation that the program has been stored beforehand in the ROM 1202, the program may be supplied and updated via another storage medium or a network.

Figure 13:
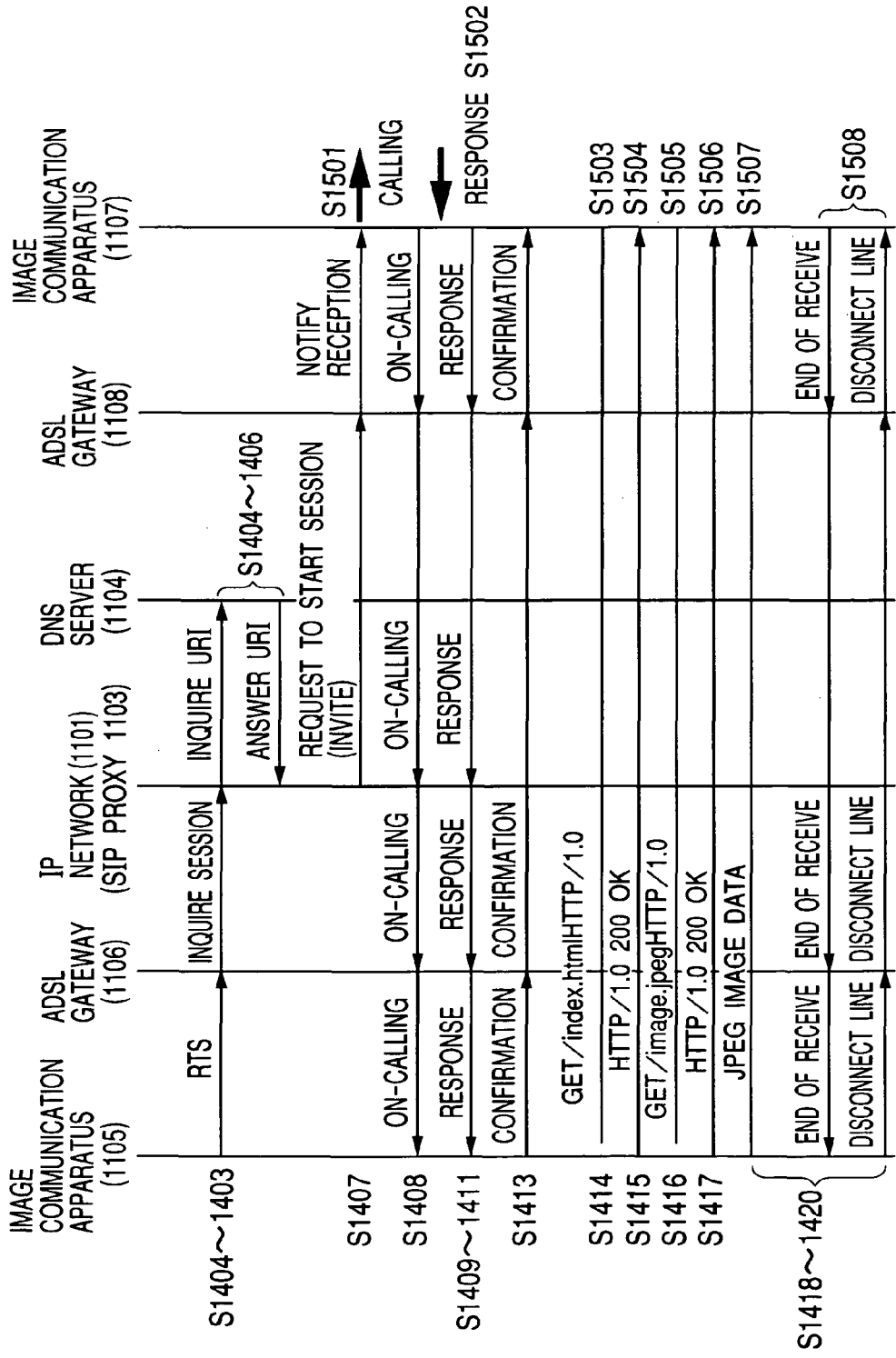
FIG. 13 is an explanatory diagram showing a communication sequence utilizing VoIP (Voice over Internet Protocol)/SIP (Session Initiation Protocol) and for sending an image in IP communication.

FIG. 13 shows a communication sequence achieved by the communication control shown in FIGS. 15A, 15B and 16, and the steps numbers shown in FIG. 13 correspond to the respective steps shown in FIGS. 15A, 15B and 16.

<Image Sending from First Image Communication Apparatus to Second Image Communication Apparatus>

When a telephone number of a destination is input by the key operation unit 1204 of the image communication apparatus 1105 (step S1401), a packet of request-to-send (RTS) including the telephone number information is sent to the ADSL gateway 1106 via the CSMA/CD interface 1108 (step S1402). In this case, the private IP address (192.168.0.1) of the ADSL gateway 1106 is involved in the sending destination address of such an RTS packet and then sent.

The ADSL gateway 1106 which received the RTS packet sends a session request message (INVITE message) of the SIP to the SIP proxy server 1103 of an IP service agency (step S1403). The session request message is composed based on the specifications of the SIP, and the telephone number information input in the step S1401 and the telephone number information of the ADSL gateway being the sending-source information are included in the destination of the header of this message. Furthermore, the IP address of the SIP proxy server 1103 is stored at the sending-destination IP address of the IP packet which stores the session request message, and the IP address of the ADSL gateway 1106 is stored at the sending-source IP address of the IP packet. Besides, a content type "application/sdp" is described in the header of the session request message so as to indicate that the data based on an SDP (Session Description Protocol) is included in the message body. Further, in the SDP data of the message body, it is described that the medium is a JPEG image ("image/jpeg"), whereby it is possible to perceive that the ADSL gateway 1108 sends/receives the JPEG image data hereafter.

Then, the SIP proxy server 1103 decompresses the telephone number in the header of the received session request message into URL (Uniform Resource Locater) (or URI (Uniform Resource Identifier)) such as "8. 7. 6. 5. 4. 3. 2. 1. e164. arpa" (step S1404), and sends a retrieving request to the DNS server 1104 (step S1405).

When the IP address of the ADSL gateway 1108 of the destination is received from the DNS server 1104 (step S1406), the SIP proxy server 1103 changes the sending-destination IP address in the packet received from the ADSL gateway 1106 into the global IP address of the ADSL gateway 1108 received from the DNS server, changes the sending-source IP address for the IP address of the SIP proxy server

1103, and then sends the session request message to the ADSL gateway 1108 (step S1407).

The ADSL gateway 1108 which received the session request message sends a reception message to the image communication apparatus 1107 (step S1501 in FIG. 16). The reception message includes medium classification information described in the session request message previously received from the ADSL gateway 1106, whereby the image communication apparatus 1107 can perceive that the sending (receiving if viewed from the image communication apparatus 1107) of the JPEG image has been requested.

In the above, the image communication apparatus 1107 can perceive that the sending (receiving if viewed from the image communication apparatus 1107) of the JPEG image has been requested, based on the medium classification information described in the session request message. However, the present embodiment is not limited to this, that is, a request of sending (receiving if viewed from the image communication apparatus 1107) of the JPEG image may be notified in a confirmation response in a later-described step S1409. Moreover, a request of sending (receiving if viewed from the image communication apparatus 1107) of the JPEG image may be notified before getting "GET/index.html HTTP/1.0" as a data getting message of the HTTP in a step S1503 after the confirmation response in the step S1409.

At the same time, the ADSL gateway 1108 sends an on-calling message to the SIP proxy server 1103. Here, the sending-source telephone number information described in the heater of the received session request message is stored at the destination in the header of the on-calling message, and the IP address of the SIP proxy server 1103 being the sending-source IP address of the session request message is stored as the sending-destination IP address. The SIP proxy server 1103 which received the on-calling message changes the sending-destination IP address for the IP address of the ADSL gateway 1106 and also changes the sending-source IP address for the IP address of the SIP proxy server 1103. Then, the proxy server 1106 send thus changed on calling message, and the ADSL gateway 1106 receives it (step S1408).

The image communication apparatus 1107 receives the reception message, and sends a response message to the ADSL gateway 1108 if it is in a receivable state (step S1502 in FIG. 16).

The ADSL gateway 1108 which received the response message further sends the response message to the SIP proxy server 1103 as well as the previous on-calling message. Then, the SIP proxy server 1103 changes only the sending-destination IP address for the IP address of the ADSL gateway 1106 this time, and the ADSL gateway 1106 thus receives the response message (step S1409 in FIG. 15A).

Subsequently, the response message is sent from the ADSL gateway 1106 to the image communication apparatus 1105 (step S1410). The ADSL gateway 1106 can perceive the IP address of the ADSL gateway 1108 by means of the sending-source IP address included in the received response message, whereby it subsequently becomes possible to directly send the packet to the ADSL gateway 1108 (further to image communication apparatus 1107) without using the SIP proxy server 1103 (step S1411).

The image communication apparatus 1105 which received the response message sends a response confirmation message to the image communication apparatus 1107 (step S1413), whereby it is possible to start sending/receiving of the image data between the image communication apparatus 1105 and the image communication apparatus 1107.

As described above, both the IP addresses (i.e., global IP addresses of ADSL gateways 1106 and 1108) have been already known between the data sending and receiving devices, whereby it subsequently becomes possible to send and receive the image data by utilizing the data send/receive protocol on the arbitrary TCP (UDP)/IP. As the data send/receive protocol on the TCP(UDP)/IP, the generally used FTP (File Transfer Protocol), the generally used the HTTP (HyperText Transport Protocol), a system to which these protocols are applied (also including a dedicated system, the encrypted version of the FTP or the HTTP, a protocol such as an IPP (Internet Printing Protocol), an IPPFAX based on the HTTP defined by IEEE (Institute of Electrical and Electronic Engineers), etc.) and the like can be used. In the following, the method of sending/receiving the image data by using the HTTP will be described.

The image communication apparatus 1107 which perceived, based on the previous session request message, that the image communication apparatus 1105 intends to send the JPEG image data establishes HTTP connection (exchanging of SYN and ACK), and further sends the message "GET/index.html HTTP/1.0" as the data getting message of the HTTP to the image communication apparatus 1105 (steps S1502 and S1503 in FIG. 16).

Then, the image communication apparatus 1105 which received the data getting message (step S1414 in FIG. 15B) sends a message "HTTP/1.1 200 OK" as the response message to the image communication apparatus 1107 (step S1415 in FIG. 15B). Besides, a content type "image/jpeg" is described in the message to indicate that the JPEG image data is sent.

Moreover, the image communication apparatus 1107 which received the response message (step S1504) sends a JPEG image sending request message "GET/image.jpeg HTTP/1.0" as the message to request the sending of the JPEG image (step S1505). As above, because the HTTP is used, it takes the format that the image communication apparatus 1107 requests the image to the image communication apparatus 1105.

The image communication apparatus 105 which received the above message (step S1416) sends a response message "HTTP/1.0 200 OK" (step S1417 in FIG. 15B, step S1506 in FIG. 16). Then, the image communication apparatus 1105 starts to send the JPEG image data subsequent to the response message.

The image data is set up to the TCP/IP frame and sent, and the IP address of the ADSL gateway 1108 is added as the destination address. In regard to the TCP/IP packet sent to the ADSL gateway 1108, the sending-destination address is converted into the private IP address of the image communication apparatus 1107 by the ADSL gateway 1108. Then, this packet is sent to the image communication apparatus 1107.

In the image communication apparatus 1105, the CPU 1201 reads the JPEG data stored in the memory card via the card I/F 1211 (step S1418), and transfers the read data to the LANC 1213. In the LANC 1213, the data of a certain amount are packeted, the IP address (192.198.0.1) of the previously received destination ADSL gateway 1108 is added as the header of the packet, and the obtained packet is sent (step S1419).

The ADSL gateway 1108 which received the image data transfers the received data to the image communication apparatus 1107 after converting the IP address thereof as described above. Then, the image communication apparatus 1107 which received the image data (step S1507 in FIG. 16) starts a process necessary to record the received JPEG image by the record processing unit 1214. That is, the image communication apparatus 107 deletes the header thereof in the LANC 1213 and stores the JPEG data in the RAM 1203 to give the data to the record processing unit 1214 via appropriate scheduling.

When all the JPEG data are sent from the image communication apparatus 1105 to the image communication apparatus 1107 (step S1420 in FIG. 15B, step S1508 in FIG. 16), the image sending ends. The received JPEG data is decompressed in the JPEG processing unit 1212 (step S1509), the decompressed data is converted into four color data of C, M, Y and K in the record processing unit 1214 (step S1510), and the converted color data is printed and output (step S1511).

By the above procedure, high-speed image sending can be achieved. Here, if it is assumed that the data size of the JPEG image taken by the digital camera is 300 KB and an upload send speed of the ADSL line is 1 Mbps, a time necessary for data sending is at longest about 300K÷(1000K÷8)=2.4 seconds.

In the above, it is thought that the image of JPEG format is sent between the image communication apparatuses 1105 and 1107. However, it is needless to say that an image file (also non-image data) of G3 format or TIFF (Tag Image File Format)/G3 format can be naturally sent under substantially the same communication control as above. When it is supposed that the image of G3 format is sent, a send speed on the analog communication path is only 56 Kbps or so in maximum. Moreover, in fact, it is supposed that the effective speed is further lowered due to execution of the T.30 protocol. Thus, if the above communication procedure is used to send the image of G3 format, it is possible to remarkably increase the facsimile communication speed.

Incidentally, when the data of G3 format (or data of another format) is received, it is needless to say that the processes on the receiving side shown in the steps S1509 to S1511 of FIG. 16 should be of course replaced by the following processes, that is, the received data of G3 format (or data of another format) is decoded (S1509), a process such as color conversion or the like is performed to the decoded data if necessary (S1510), and the processed data is reproduced (S1511).

As described above, according to the present embodiment, the image communication apparatus 1105 can send/receive the image at high speed without using the analog communication path to/from another image communication apparatus having the function to connect the VoIP network. Thus, the calling side only has to input the telephone number, as well as the conventional facsimile apparatus of PSTN (Public Switched Telephone Network) connection type or the like, whereby it is very easy.

In the image communication on the IP network according to the present embodiment, by partially utilizing the SIP used in the VoIP network, it is possible to know the IP address and the port number of the destination and send the image data at high speed by using specific services (HTTP, FTP, etc.) on the TCP(or UDP)/IP.

Furthermore, the user on the sending side only has to input the telephone number to designate the destination and does not need to perform other troublesome operations. That is, only by inputting the prefix of the telephone number, it is possible to designate whether or not to send the image to the destination via the VoIP network.

In the present embodiment, the IP address of the sending destination is added to the image data packet to be sent. However, the same effect as above can be obtained by such a process that the sending-source image communication apparatus adds the IP address of the SIP proxy server to the image data and then the SIP proxy server converts the added IP address into the IP address of the sending destination.

<Image Sending from WWW Server to (Second) Image Communication Apparatus>

In the above embodiment, the HTTP is used to send the communication data. As is generally known, the HTTP is widely used to download various kinds of data files from the WWW server on the Internet.

On one hand, the image communication apparatus in the above embodiment can be structured as a (network-corresponding) facsimile machine or a so-called multifunctional image processing apparatus. Besides, supporting HTTP transfer is helpful not only in the data sending/receiving as in the above embodiment but also in causing the image communication apparatus to function as a WWW browser terminal equipment (or a general-purpose Internet terminal equipment).

Figure 14:
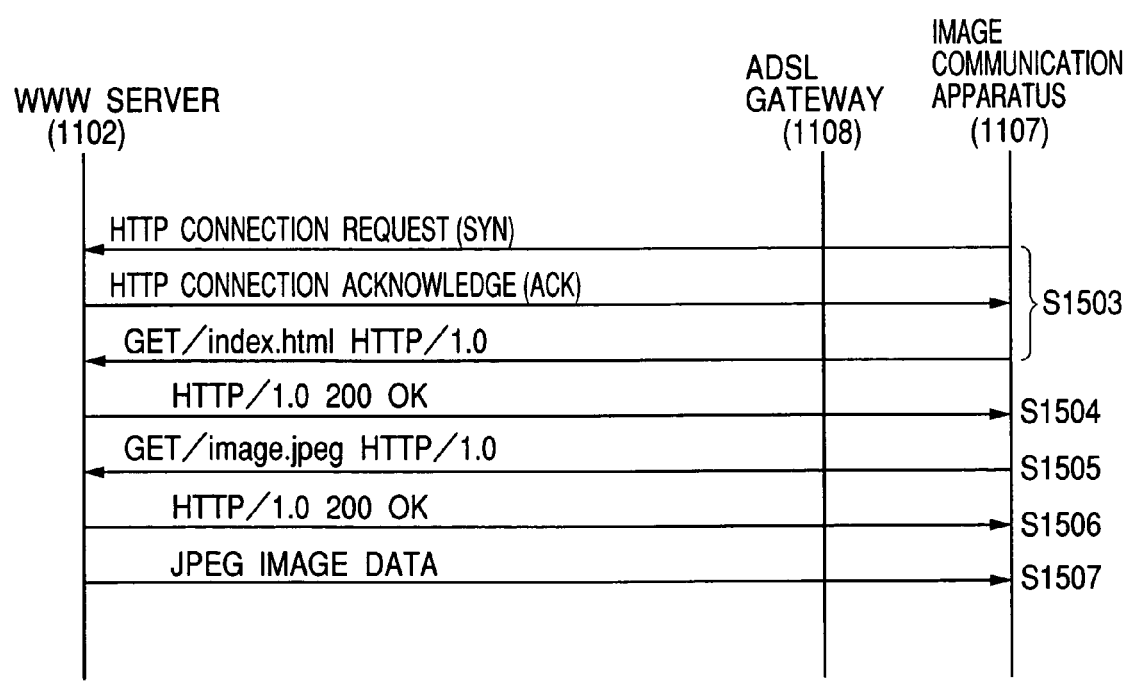
FIG. 14 is an explanatory diagram showing a data send/receive sequence according to an HTTP.

In order to show the above, a state of communication between the WWW server and the second image communication apparatus of the present invention will be explained with reference to FIGS. 14 to 16. Here, FIG. 14 shows the sequence of the form same as that shown in FIG. 13, and, in this sequence, the step numbers shown in FIG. 14 correspond to the respective steps shown in FIG. 16. Incidentally, because the step S1415 and the following steps in the processes of the image communication apparatus shown in FIG. 15B are equivalent to the processes of the WWW server, the step S1415 and the following steps will be cited as the processes of the WWW server in the following.

When it is instructed by the key operation unit 1204 of the image communication apparatus 1107 to print (or display) the contents downloaded from the WWW server and the URL of the access destination is input (step S1512), PPP (Point-to-Point Protocol) connection is established via an access server of an ISP (Internet Service Provider) if necessary at this stage (i.e., if image communication apparatus 1107 is unconnected to IP network 1101 via ADSL gateway 1108).

Then, HTTP connection (typically, port No. 80 is used) is established between the image communication apparatus 1107 and the WWW server 1102 registered (or arbitrary) in the image communication apparatus 1107 (step S1513). Incidentally, an authentication process to check the ID and the password between the image communication apparatus 1107 and the access server of the ISP or the like is performed when the PPP connection is established, and the authentication process to check the ID and the password between the image communication apparatus 1107 and the WWW server 1102 if necessary when the HTTP connection is established. Moreover, the image communication apparatus 1107 refers to the DNS server 1104 if necessary when the HTTP connection is established.

When the HTTP connection is established, the image communication apparatus 1107 sends a data getting message of the HTTP (step S1503). For example, if the URL of the access destination is "http://www.canon.com/index.html", a message "GET/www.canon.com/index.html HTTP/1.0" is sent.

Then, the WWW server 1102 which received this message (step S1414 in FIG. 15B) sends the message "HTTP/1.1 200 OK" as the response message to the image communication apparatus 1107 (step S1415). Besides, the content type "image/jpeg" is described in the message to indicate that the JPEG image data is sent.

The image communication apparatus 1107 which received the response message (step S1504 in FIG. 16) sends the JPEG image sending request message "GET/image.jpeg HTTP/1.0" as the message to request the sending of the JPEG image (step S1505). However, the data to be get need not be the JPEG image, and the portion "/image.jpeg" of each HTTP message may be an arbitrary file name of arbitrary form.

Then, the WWW server 1102 which received the above message (step S1416 in FIG. 15B) sends the response message "HTTP/1.0 200 OK" (step S1417 in FIG. 15B, step S1506 in FIG. 16).

Subsequently, the image data (or arbitrary file data) is set up to the TCP/IP frame and sent to the image communication apparatus 1107 (step S1507 in FIG. 16), and the global IP address of the ADSL gateway 1108 is used as the sending-destination address. In regard to the TCP/IP packet sent to the ADSL gateway 1108, when the ADSL gateway 1108 receives the image data of HTTP packet format, as described above, the ADSL gateway 1108 converts the global IP address of sending destination into the private IP address and then sends the image data to the image communication apparatus 1107. The image communication apparatus 1107 which received the image data starts to prepare a recording process of the received JPEG image. That is, the header is deleted in the LANC 1213 and the JPEG data is stored in the RAM 1203.

When all the JPEG data are sent from the WWW server 1102 to the image communication apparatus 1107 (step S1508 in FIG. 16), the received JPEG data is decompressed in the JPEG processing unit 1212 in the same manner as above (step S1509), the decompressed data is converted into four color data of C, M, Y and K in the record processing unit 1214 (step S1510), and the converted color data is recording-output (step S1511). Here, in the present embodiment, the recording output of the image data is shown by way of example. But, it is of course possible to apply an output (reproduction) method of displaying the data on a display.

As described above, the image communication apparatus can download the JPEG image data file or another arbitrary data file from the WWW server and then output (reproduce) the downloaded data file.

As is apparent from the above explanation, the image data sending according to the present invention is performed in the procedure quite the same as the ordinary download process based on the HTTP. That is, the image communication apparatus according to the present invention has the excellent advantage that both the function as the WWW browser terminal equipment (or general-purpose Internet terminal equipment) and the function as the (network-corresponding) facsimile machine, the multifunctional image processing apparatus or the like can be achieved by the simple and low-cost hardware/software structure.

Although the above embodiment premises that the image data to be sent and received is recording-output, it is needless to say that the data sending technique according to the present invention is similarly applied to other methods such as a displaying-output method, and even in other methods, the same effect as described above can be obtained in regard to the data sending.

When the image data (or data of another format) is sent according to the HTTP, the image communication apparatus (or WWW server) on the sending side sends the image data correlated with a markup language such as an HTML (Hyper Text Markup Language) or the like. The image communication apparatus, on the receiving side, which received the markup language and the image data can display them in the same procedure as that in case of displaying a markup language and image data received from the WWW server. At this time, if a user interface (GUI) which is substantially the same as the ordinary WWW browser is used, it is possible by the same user operation as that for the WWW browser to perform the data operations quite the same as those generally performed by the WWW browser, for example, printing of the image data (or data of another format), storing of the image data, transferring of the image data to another terminal equipment. Of course, when a tag indicating data printing or file storing or a reference tag (link) to another data is included in the HTML downloaded from the WWW server, it is possible to perform displaying according to the included tag. Moreover, by the user interface (GUI) substantially the same as the ordinary WWW browser, a user can perform the data printing, the file storing, jumping to another data, and the like according to the corresponding tags.

Furthermore, all the processes capable of being performed to the WWW server data can be similarly performed to the data sent from the image communication apparatus on the sending side, according to their data structures (i.e., structures of tag, MIME (Multipurpose Internet Mail Extensions) identifier and the like). Thus, it becomes unnecessary for the user to remember a quite different operation for each image communication or each reference to the WWW data.

Moreover, in the above embodiment, the image communication apparatus (1105, 1107) and the ADSL gateway (1106, 1108) are assumed as the physically independent apparatuses. However, the same effect as above can be obtained even if the ADSL gateway and the image communication apparatus are unified. That is, by unifying the ADSL gateway and the image communication apparatus, it becomes unnecessary to exchange commands between the ADSL gateway and the image communication apparatus because the ADSL gateway and the image communication apparatus are connected by a dedicated bus or the like without using CSMA/CD interface, and it is thus possible to increase communication efficiency.

Moreover, in addition to the above structure of "ADSL modem+splitter", a router or the like for sharing the IP connection with another network terminal equipment may be unified as the structure of the line interface portion shown as the ADSL gateway in the above embodiment. Besides, the function as the gate keeper for the VoIP and the function as the facsimile gateway of Recommendation T.38 may be included in the line interface portion shown as the ADSL gateway.

Moreover, in the above, the ADSL service is supposed as the network communication service. However, the technique of the present invention, particularly the transfer technique that the VoIP/SIP is utilized in the former half of the communication, and the FTP, the HTTP or the like is utilized in the latter half of the communication, is not limited to the ADSL service. That is, the technique of the present invention can be executed likewise in other networks such as an FTTH (Fiber To The Home) network, an ATM (Asynchronous Transfer Mode) network and the like if these networks are in the network communication environments capable of utilizing the VoIP/SIP. Even when the networks such as the FTTH network, the ATM network and the like different from the ADSL network are utilized, it is only necessary to change the network interface (ADSL modem 1216 in FIG. 11) on the WAN side to the interface suitable for the utilized network, that is, other structures may be the same as those shown in the above embodiment. Besides, even when it is necessary to use the analog communication path, the technique of the present invention can be executed likewise if there is an analog communication means of some kind (VoIP gate keeper, facsimile gateway according to ITU-T Recommendation T.38, or the like) in addition to the IP communication means between the line interface (ADSL gateway in the above case) and the image communication means (image communication apparatus in the above case).

Moreover, in the above, the example that the image data is sent from the calling side is explained. However, it is needless to say that the procedure of the present invention can be used even in a case where the image data is sent in the opposite direction, that is, polling sending/receiving is performed.

That is, when the HTTP is used in data sending, it is merely required that the data sending side has the function as the HTTP server side, and the data receiving side has the function as the HTTP server side. This is because it is irrelevant whether the apparatus on the calling side or the apparatus on the called side has the above function. Then, the HTTP data sending in the latter half of the communication can be achieved only by exchanging the HTTP message in the direction opposite to the above direction.

In the above embodiment, the explanations of authentication and security measures are omitted for simplification. However, when the HTTP is used in the data sending as in the above embodiment, it is not preferable for the image communication apparatus on the sending side to always leave its HTTP port open for unspecified number of communication partners, no it is necessary to take some kinds of actions on authentication and security. For example, it is supposed to authenticate the user ID and (or) the password (both previously allocated to image communication apparatus, or determined by user) at the stage of establishment of the HTTP connection (step S1414 in FIG. 15B, and step S1503 in each of FIGS. 14 and 16), to cause the image communication apparatus on the sending side to open the HTTP port only in regard to the IP address on the receiving side gotten by the previous SIP communication only during the data sending period (steps S1414 to S1420 in FIG. 15B, and steps S1503 to S1507 in FIG. 16) (such port control or packet filtering can be performed not only by image communication apparatus but also by gateway (ADSL gateway)), and the like.

As described above, in the present invention, the communication apparatus on the calling side sends the data communication request based on the SIP by using the input telephone number, and then starts the communication procedure conforming to the HTTP. Therefore, the apparatus on the calling side only has to perform the simple user operation through the medium of telephone number, and it is possible to easily and inexpensively apply both a WWW browsing function using the HTTP and a real-time one-to-one (PTP: Peer To Peer) data receiving function between data sending and receiving apparatuses to the communication apparatus on the data receiving side. Moreover, even when the communication apparatus is connected particularly to the line service such as the ADSL, it is possible to avoid a problem of the conventional facsimile machine that throughput thereof seriously degrades by the data communication performed in the voice band.

As apparent from the above explanation, according to the present invention, in the communication method and apparatus which send/receive, by the IP communication, the communication data between the communication apparatuses discriminated by the telephone numbers, and the control program for the communication apparatus, the structure that the first communication apparatus obtains the IP address of the second communication apparatus from the predetermined server based on the telephone number of the second communication apparatus and sends the data communication request to the second communication apparatus, and the communication apparatus on the data receiving side of the first and second communication apparatuses sends the data sending request to the communication apparatus on the data sending side based on the data send/receive protocol conforming to the HTTP and sends/receives the communication data on the IP network based on the data send/receive protocol, is adopted. Therefore, the apparatus on the calling side only has to perform the simple user operation through the medium of telephone number, it is possible to easily and inexpensively apply both the WWW browsing function using the HTTP and the real-time one-to-one (PTP) data receiving function between the data sending and receiving apparatuses to the communication apparatus on the data receiving side, and it is further possible to achieve the high-speed data communication on the IP communication path based on the data send/receive protocol conforming to the HTTP. That is, according to the present invention, it is possible to obtain the significant effects of providing the communication system which can perform the high-speed data communication by the simple calling operation through the medium of telephone number, is excellent in versatility, and can be easily applied inexpensively.

What is claimed is:

1. A communication apparatus which includes IP (Internet Protocol) communication means and transmits/receives communication data to/from a destination station discriminated by a telephone number, comprising:

IP address obtaining means for obtaining an IP address of the destination station from an SIP (Session Initiation Protocol) proxy server based on the telephone number of the destination station;

facsimile communication means for performing facsimile communication to/from the destination station;

converting means for converting a signal received/transmitted from/to said facsimile communication means without via a line switching network, into VoIP (Voice over Internet Protocol) data on an IP network;

IP network connecting means for connecting to the IP network; discriminating means for discriminating whether or not the destination station is able to transmit/receive communication data on the IP network based on a predetermined file transmit/receive protocol independent of a facsimile protocol;

first IP communication means for transmitting/receiving image data to/from the destination station based on a predetermined file transmit/receive protocol independent of a facsimile protocol in accordance with a discrimination result that the destination station is able to transmit/receive communication data on the IP network based on the predetermined file transmit/receive protocol independent of the facsimile protocol, wherein the image data is transmitted/received via the IP network connecting means without via a line switching network, using the obtained IP address of the destination station; and second IP communication means for transmitting/receiving image data to/from the destination station based on the facsimile protocol by said facsimile communication means, and transmitting/receiving the VoIP data obtained through said converting means to/from a gateway of the destination station, in accordance with a discrimination result that the destination station is not able to transmit/receive communication data on the IP network based on the predetermined file transmit/receive protocol independent of the facsimile protocol, wherein the VoIP data is transmitted/received via the IP network connecting means without via a line switching network, using the obtained IP address of the destination station.

2. A communication apparatus according to claim 1, wherein said IP address obtaining means judges, by analyzing the telephone number of the destination station, whether or not the obtaining means is able to perform the communication with the destination station via a VoIP (Voice over Internet Protocol) network, and tries to obtain the IP address of the destination station from a predetermined server when it is able to perform the communication via the VoIP network, and said first IP communication means transmits/receives the image data to/from the destination station on the IP network based on the predetermined file transmit/receive protocol independent of the facsimile protocol by using the obtained IP address of the destination station.

3. A communication apparatus according to claim 1, wherein said IP network connecting means is an ADSL (Asymmetric Digital Subscriber Line) modem.

4. A communication apparatus according to claim 1, wherein the IP address of the destination station is obtained from a predetermined server based on the telephone number of the destination station by using a predetermined UDP (User Datagram Protocol), and said first IP communication means transmits/receives the image data to/from the destination station by using the obtained IP address of the destination station, based on a predetermined TCP (Transmission Control Protocol).

5. A control method executed in a communication apparatus which includes an IP (Internet Protocol) communication means and transmits/receives communication data to/from a destination station discriminated by a telephone number, an IP address obtaining means for obtaining an IP address of the destination station from an SIP (Session Initiation Protocol) proxy server based on the telephone number of the destination station, a facsimile communication means for performing a facsimile communication to/from the destination station, a converting means for converting a signal received/transmitted from/to said facsimile communication means without via a line switching network, into VoIP (Voice over Internet Protocol) data on the IP network, an IP connecting means for connecting to the IP network, the method comprising:
- a discriminating step of discriminating whether or not the destination station is able to transmit/receive communication data on the IP network based on a predetermined file transmit/receive protocol independent of a facsimile protocol;
- a first IP communication step of transmitting/receiving image data to/from the destination station based on a predetermined file transmit/receive protocol independent of a facsimile protocol in accordance with a discrimination result that the destination station is able to transmit/receive communication data on the IP network based on the predetermined file transmit/receive protocol independent of the facsimile protocol, wherein the image data is transmitted/received via the IP network connecting means without via the line switching network, using the obtained IP address of the destination station; and
- a second IP communication step of transmitting/receiving image data to/from the destination station based on the facsimile protocol by said facsimile communication means, and transmitting/receiving the VoIP data obtained through said converting means to/from a gateway of the destination station, in accordance with a discrimination result that the destination station is not able to transmit/receive communication data on the IP network based on the predetermined file transmit/receive protocol independent of the facsimile protocol, wherein the VoIP data is transmitted/received via the IP network connecting means without via the line switching network, using the obtained IP address of the destination station.

6. A control method according to claim 5, wherein the IP address obtaining means judges, by analyzing the telephone number of the destination station, whether or not the obtaining means is able to perform the communication with the destination station via a VoIP network, and tries to obtain the IP address of the destination station from a predetermined server when it is able to perform the communication via the VoIP network, and the first IP communication step transmits/receives the image data to/from the destination station on the IP network based on the predetermined file transmit/receive protocol independent of the facsimile protocol by using the obtained IP address of the destination station.

7. A control method according to claim 5, wherein the IP network connecting unit is an ADSL (Asymmetric Digital Subscriber Line) modem.

8. A control method according to claim 5, wherein the IP address of the destination station is obtained from a predetermined server based on the telephone number of the destination station by using a predetermined UDP (User Datagram Protocol), and the first IP communication step transmits/receives the image data to/from the destination station by using the obtained IP address of the destination station, based on a predetermined TCP (Transmission Control Protocol).

9. A non-transitory computer-readable storage medium on which is stored computer code for a control program for a communication apparatus which includes an IP (Internet Protocol) communication means and transmits/receives communication data to/from a destination station discriminated by a telephone number, an IP address obtaining means for obtaining an IP address of the destination station from an SIP (Session Initiation Protocol) proxy server based on the telephone number of the destination station, a facsimile communication means for performing a facsimile communication to/from the destination station, a converting means for converting a signal received/transmitted from/to said facsimile communication means without via a line switching network, into VoIP (Voice over Internet Protocol) data on the IP network, an IP connecting means for connecting to an IP network, the program comprising:
- a discriminating step of discriminating whether or not the destination station is able to transmit/receive communication data on the IP network based on a predetermined file transmit/receive protocol independent of a facsimile protocol;
- a first IP communication step of transmitting/receiving image data to/from the destination station based on a predetermined file transmit/receive protocol independent of a facsimile protocol in accordance with a discrimination result that the destination station is able to transmit/receive communication data on the IP network based on the predetermined file transmit/receive protocol independent of the facsimile protocol, wherein the image data is transmitted/received via the IP network connecting means without via the line switching network, using the obtained IP address of the destination station; and
- a second IP communication step of transmitting/receiving image data to/from the destination station based on the facsimile protocol by said facsimile communication means, and transmitting/receiving the VoIP data obtained through said converting means to/from a gateway of the destination station, in accordance with a discrimination result that the destination station is not able to transmit/receive communication data on the IP network based on the predetermined file transmit/receive protocol independent of the facsimile protocol, wherein the VoIP data is transmitted/received via the IP network connecting means without via the line switching network, using the obtained IP address of the destination station.

10. A non-transitory computer-readable storage medium according to claim 9, wherein the IP address obtaining means judges, by analyzing the telephone number of the destination station, whether or not the obtaining means is able to perform the communication with the destination station via a VoIP network, and tries to obtain the IP address of the destination station from a predetermined server when it is able to perform the communication via the VoIP network, and the first IP communication step transmits/receives the image data to/from the destination station on the IP network based on the predetermined file transmit/receive protocol independent of the facsimile protocol by using the obtained IP address of the destination station.

11. A non-transitory computer-readable storage medium according to claim 9, further comprising a control step of performing the transmission/reception of the communication data on the IP network and the transmission/reception of the communication data on an analog communication path by using an ADSL (Asymmetric Digital Subscriber Line) modem.

12. A non-transitory computer-readable storage medium according to claim 9, further comprising a control step of obtaining the IP address of the destination station from a predetermined server based on the telephone number of the destination station by using a predetermined UDP (User Datagram Protocol), and the first IP communication step transmits/receives the image data to/from the destination station by using the obtained IP address of the destination station based on a predetermined TCP (Transmission Control Protocol).

* * * * *